US00RE41859E

(19) United States
(12) Reissued Patent
Husain et al.

(10) Patent Number: US RE41,859 E
(45) Date of Reissued Patent: Oct. 26, 2010

(54) INFUSION OF COMBUSTION GASES INTO BALLAST WATER PREFERABLY UNDER LESS THAN ATMOSPHERIC PRESSURE TO SYNERGISTICALLY KILL HARMFUL AQUATIC NUISANCE SPECIES BY SIMULTANEOUS HYPERCAPNIA, HYPOXIA AND ACIDIC PH LEVEL

(76) Inventors: Mo Husain, 150 Solace Ct., Encinitas, CA (US) 92121; Robert Apple, 30 Racquet Club Dr., So., Rancho Mirage, CA (US) 92270; Dmitry Altshuller, 11937 Honey Hollow, Moreno Valley, CA (US) 92557; Henry Hunter, 232 Cassou Rd., San Marcos, CA (US) 92069

(21) Appl. No.: 11/484,828

(22) Filed: Jul. 10, 2006

Related U.S. Patent Documents

Reissue of:

(64) Patent No.: 6,761,123
Issued: Jul. 13, 2004
Appl. No.: 10/366,759
Filed: Feb. 14, 2003

U.S. Applications:
(

(63) Continuation-in-part of application No. 10/120,339, filed on Apr. 9, 2002, now Pat. No. 6,722,933, which is a continuation-in-part of application No. 09/865,414, filed on May 25, 2001, now Pat. No. 6,539,884.

(51) Int. Cl.
*B63B 25/08* (2006.01)

(52) U.S. Cl. ..... 114/74 R; 210/755; 210/931; 514/557

(58) Field of Classification Search ..... 114/74 R, 114/74 A, 74 T; 210/755; 514/557
See application file for complete search history.

(56) References Cited

U.S. PATENT DOCUMENTS 3,251,357 A 5/1966 Williamson
5,192,451 A * 3/1993 Gill ..... 210/755
5,376,282 A 12/1994 Chang
5,578,116 A 11/1996 Chang
5,932,112 A * 8/1999 Browning, Jr.
6,125,778 A * 10/2000 Rodden ..... 114/74 R
6,171,508 B1 1/2001 Browning, Jr.
6,221,262 B1 * 4/2001 MacDonald et al. ..... 210/757
6,284,793 B1 * 9/2001 Fuchs et al. ..... 514/557
6,539,884 B1 4/2003 Husain
6,626,122 B2 * 9/2003 O'Reilly et al. ..... 114/74 R
6,722,933 B2 4/2004 Hunter
6,821,442 B1 11/2004 Watten
6,840,983 B2 1/2005 McNulty
6,921,488 B1 7/2005 Jelmert

OTHER PUBLICATIONS

McMahon, Robert F., Matthews, Milton A., Shaffer, Lawrence R., and Johnson, Paul D., "Effects of Elevated Carbon Dioxide Concentrations on Survivorship in Zebra Mussels (Dreissena polymorpha) and Asian Clams (Corbicula fluminea)".

Payne, Bruce S., Miller, Andrew and Adams, Ginny, "Effects of Elevated Carbon Dioxide Concentrations on Survivorship in Zebra Mussels (Dreissena polymorpha)", Zebra Mussel Research Technical Notes, Sep. 1998, No. ZMR–2–21 (Prepared and published by the Zebra Mussel Research Program, U.S. Army Engineer Waterways Experiment Station).

Elzinga, W.J., and Butzlaff, T.S., "Carbon Dioxide as a Narcotizing Pre–Treatment for Chemical Control of Dreissena polyorpha", Proceedings of the Fourth International Zebra Mussel Conference, Mar. 1994, Madison, Wisconsin.

Greenman, Debra, Mullen, Kevin, Parmar, Shardool and Friese, USCG, Chris, LT., "Port–Based Ballast–Water Treatment Systems: A Feasibility Study in the Port of Baltimore", ANS Aquatic Nuisance Species Digest, Aug. 1998, vol. 2, No. 4.

Tamburri, M.N., Wasson, K., Matsuda, M., "Ballast Water Deoxygenation Can Prevent Aquatic Introductions While Reducing Ship Corrosion", Biological Conservation, 2002, 103, 331–341.

Tamburri, M.N., Wasson, K., and Matsuda, M., "Ballast Water Deoxygenation Can Prevent Species Introduction While Reducing Ship Corrosion", Proceedings of the Second International Conference on Marine Bioinvasions, Apr. 9–11, 2001, New Orleans, LA., pp. 134–135.

NOTE: FIGURE 4A DEPICTS TYPICAL BALLAST TREATMENT PIPING IN AS SINGLE HULL TANKER SEGREGATED BALLAST TANK. IN A DOUBLE HULL VESSEL THE PIPING SYSTEM IS SIMPLIFIED BY INSTALLING THE NOZZLE GRID ON THE TANK BOTTOM WITHOUT ANY STRUCTURAL INTERFERENCE.

Johnson, Paul D., and McMahon, Robert F., "Effects of temperature and chronic hypoxia on survivorship of the zebra mussel (Dreissena polymorpha) and Asian clam (Corbicula fluminea)", Canadian Journal of Fisheries and Acquatic Sciences (1998) 55(7): 1564–1572.
Falkner, M., Takata, L., and Gilmore, S., "Report on the California Marine Invasive Species Program", California State Lands Commission, Marine Facilities Division, Apr. 2005.
Reissue U.S. Appl. No. 11/484,282, pp. 3–4.
Tamburri, Mario N., Peltzer, Edward T., Friedrich, Gernot E., Aya, Izuo, Yamane, Kenji and Brewer, Pter G., "A Field Study of the Effects of CO2 Ocean Disposal on Mobile Deep–Sea Animals", Marine Chemistry, 72 (2000) 95–101.
Excerpts from the Aug. 25, 2006 deposition of Henry Hunter taken on behalf of Defendants in the Litigation in San Marcos, California.
Barry S. Payne, et al., Zebra Mussel Research Technical Note, No. Z[.]R–2–21 Sep. 1998, Research Program, U.S. Army Engineer Waterways Experiment Station, Vicksburg, MS.
Barnaby J. Watten, et al., Feasibility of measuring dissolved carbon dioxide based on head space partial pressures, Elsevier Agricultural Engineering 30 (2004) 83–101.
Mario N, Tamburri, et al., A field study of the effects of CO2 ocean disposal on mobile deep–sea animals, Elsevier Marine Chemistry 72(2000) 95–101.
Deventerm B.; and Heckman; C.W., Effects of proloned darkness on the relative pigment content of cultured diatoms and green Algae; Aquatic Sciences 58/3. 1996.
Hinga, K. R., Effects of PH on coastal marine pytoplankton; Marine Ecology Process Serices, vol. 238, 281–396, 2002.
Lutey, W.L.; Treatment for the mitigation of MIC, Practical Manual on Microbiotically Influenced Corrosion, vol. 2, NACE Press.

* cited by examiner

*Primary Examiner*—Lars A Olson
(74) *Attorney, Agent, or Firm*—Fuess & Davidenas

(57) ABSTRACT

Aquatic nuisance species (ANS) in ship's ballast water are killed by permeating to equilibrium a gaseous mixture consisting essentially of, preferably, ≧84% nitrogen, ≧11% carbon dioxide and ≦4% oxygen through ship's ballast water until the ballast water itself becomes (i) hypercapnic to ≧20 ppm carbon dioxide, and, by association, (ii) acidic to pH≦7, while preferably further, and also, being rendered (iii) hypoxic to ≦1 ppm oxygen. The permeating is preferably realized by bubbling the gaseous mixture preferably obtained from an inert gas generator through the ballast water over the course of 2+ days while the ballast water is continually maintained a pressure less than atmosphere, preferably −2 p.s.i. or less. The (i) hypercapnic, (ii) acidic and (iii) hypoxic conditions—each of which can be independently realized—synergistically cooperate to kill a broad range of ANS in the ballast water without deleterious effect on the environment when, and if, the ballast water in which the balance of dissolved gases has been changed is discharged.

49 Claims, 11 Drawing Sheets

Table 1. Effects of Trimix on Marine Species

| Species | | Number/ inc. | Aerobic | Nitrogen | Trimix* |
|---|---|---|---|---|---|
| Lysmata californica | Shrimp | 10/inc | Normal | Normal | Dead after 20 min |
| Mimulus foliates | Crab | 7/inc | Normal | Normal | Dead after 75min |
| Ophioderma panamanse | Brittle star | 8/inc | Normal | Not moving but revivable by air | Dead after 50 min |
| Mytilus californianus | Mussel | 10/inc | Normal | Open but responding to touch | 6 dead after 95 min |
| Pollicipes polymerus | Barnacle | 10/inc | Normal | Normal | Dead after 60 min |
| Plankton Mix | Copepods | Lots | Normal | Dead after 15 min | Dead after 15 min |

*Trimix (2% oxygen, 12% $CO_2$ and 86% nitrogen)

FIGURE 2

Ballast Water Tank Capacity

| Location | Size $M^3$ | $Ft^3$ |
|---|---|---|
| Fore Peak | 8,265 | 291,875 |
| B3S | 32,200 | 1,137,000 |
| B3P | 32,200 | 1,137,000 |
| B6S | 16,048 | 567,000 |
| B6P | 16,048 | 567,000 |
| B Engine Room S | 1,645 | 58,000 |
| B Engine Room P | 1,086 | 74,000 |
| Aft Peak | 2,331 | 82,300 |
| Totals | 110,823 | 3,914,175 |

FIGURE 3

NOTE: FIGURE 4A DEPICTS TYPICAL BALLAST TREATMENT PIPING IN AS SINGLE HULL TANKER SEGREGATED BALLAST TANK.

IN A DOUBLE HULL VESSEL THE PIPING SYSTEM IS SIMPLIFIED BY INSTALLING THE NOZZLE GRID ON THE TANK BOTTOM WITHOUT ANY STRUCTURAL INTERFERENCE.

TYPICAL BALLAST WATER TREATMENT SCHEMATIC

PLAN VIEW OF PIPING LAYOUT INSIDE OF TYPICAL SALTWATER BALLAST TANK PLAN VIEW

SECTION THRU BALLAST TANK

PRELIMINARY COST ESTIMATE FOR BALLAST WATER TREATMENT SYSTEM

Note: Labor Cost is Based on US Repair Shipyard Estimates

PART 1

| Parts and Materials | Capacities or Type | Quantity/ Unit | Price/Unit | Material Cost | Labor Cost | Material & Labor |
|---|---|---|---|---|---|---|
| Blower (Exhaust) | 2000 CFM-100HP | 1 | $ 10,000 | $ 10,000 | $ 75,000 | $ 85,000 |
| Reciproacting Compressor | Electric-700 CFM-100HP | 2 | $ 40,000 | $ 80,000 | $ 50,000 | $ 130,000 |
| Inert Gas Generator - | 1500 CFM - 50HP | 1 | $ 175,000 | $ 175,000 | $ 150,000 | $ 325,000 |
| Row of Pipes at Tank Bottom PVC | 3" SCH 80; Length in Ft. | 15000 | $ 2 | $ 30,000 | $ 52,500 | $ 82,500 |
| Header Branch Piping - PVC | 8" SCH 80 " | 1000 | $ 5 | $ 5,000 | $ 105,000 | $ 110,000 |
| Header Piping - PVC | 10" SCH 80 " | 1800 | $ 7 | $ 12,600 | $ 252,000 | $ 264,600 |
| Header Piping - Steel | 10SCH 40 (Steel) | 2000 | $ 22 | $ 44,000 | $ 650,000 | $ 694,000 |
| Brackets | Steel | 2000 | $ 30 | $ 60,000 | $ 35,000 | $ 95,000 |
| Valves-Electric (Ballast) | 10" Butterfly | 16 | $ 4,500 | $ 72,000 | $ 7,000 | $ 79,000 |
| Valves-Electric (Inert Gas) | 10" Butterfly | 2 | $ 4,500 | $ 9,000 | $ 1,000 | $ 10,000 |
| Diffusers | Coarse Bubbles | 2600 | $ 50 | $ 130,000 | $ 10,000 | $ 140,000 |
| Fittings (Elbows,Tees, Couplings) | PVC | 4000 | $ 20 | $ 80,000 | $ 140,000 | $ 220,000 |
| Generator | 300 KW | 1 | $ 60,000 | $ 60,000 | $ 15,000 | $ 75,000 |
| Sub-Total Materials | | | | $ 767,600 | | |
| Sub-Total Labor | | | | | $ 1,542,500 | |
| Sub-Total -Materials & Labor | | | | | | $ 2,310,100 |

FIGURE 6A

PRELIMINARY COST ESTIMATE FOR BALLAST WATER TREATMENT SYSTEM
Note: Labor Cost is Based on US Repair Shipyard Estimates

PART 2

| Parts and Materials | Capacities or Type | Quantity/ Unit | Price/Unit | Material Cost | Labor Cost | Material & Labor |
|---|---|---|---|---|---|---|
| Sensors, Controllers & Computer | | | | | | |
| pH Gages | | 16 | $ 1,000 | $ 16,000 | | |
| Pressure Gages for Ullage space | | 16 | $ 500 | $ 8,000 | | |
| Pressure Controllers for Ullage | | 16 | $ 1,000 | $ 16,000 | | |
| Controller For Compressor | | 2 | $ 500 | $ 1,000 | | |
| Oxygen Sensor | | 16 | $ 500 | $ 8,000 | | |
| Controller For Valves | | 16 | $ 500 | $ 8,000 | | |
| Electrical | | 1 | $ 40,000 | $ 40,000 | | |
| Computer Software & Hardware | | 1 | $ 50,000 | $ 50,000 | | |
| Sub-Total - Material | | | | $ 147,000 | | |
| Labor for Installation | | | | $ 250,000 | | |
| Sub-Total - Material & Labor | | | | | | $ 397,000 |
| Other Costs: | | | | | | |
| Engineering & Maintenance | | | | | | $ 350,000 |
| TOTAL BW SYSTEM COST | | | | | | $ 3,057,100 |

FIGURE 6B

INFUSION OF COMBUSTION GASES INTO BALLAST WATER PREFERABLY UNDER LESS THAN ATMOSPHERIC PRESSURE TO SYNERGISTICALLY KILL HARMFUL AQUATIC NUISANCE SPECIES BY SIMULTANEOUS HYPERCAPNIA, HYPOXIA AND ACIDIC PH LEVEL

Matter enclosed in heavy brackets [ ] appears in the original patent but forms no part of this reissue specification; matter printed in italics indicates the additions made by reissue.

RELATION TO A RELATED PATENT APPLICATION

The present patent application is related as a Continuation-in-Part to U.S. patent application Ser. No. 10/120,339 filed on Apr. 9, 2002, for CLOSED LOOP CONTROL OF BOTH PRESSURE AND CONTENT OF BALLAST WATER TANK GASES TO AT DIFFERENT TIMES KILL BOTH AEROBIC AND ANAEROBIC ORGANISMS WITHIN BALLAST WATER to inventor Henry Hunter assigning to the same MH Systems, San Diego, Calif., that is the assignee of the present invention. That application is itself a Continuation-In-Part (C-I-P) of U.S. patent application Ser. No. 09/865,414 filed May 25, 2001 now U.S. Pat. No. 6,539,884, for CLOSED LOOP CONTROL OF VOLATILE ORGANIC COMPOUND EMISSIONS FROM THE TANKS OF OIL TANKERS, INCLUDING AS MAY BE SIMULTANEOUSLY SAFEGUARDED FROM SPILLAGE OF OIL BY AN UNDERPRESSURE SYSTEM, now issued as U.S. Pat. No. 6,539,884. The contents of the related predecessor patent applications are incorporated herein by reference.

BACKGROUND OF THE INVENTION

1. Field of the Invention

The present invention generally concerns shipboard design to combat Aquatic Nuisance Species (ANS) invasion resulting from ballast water discharge.

The present invention particularly concerns ballast water treatment, deoxygenation and carbonation of ballast water, reduction of pH in ballast water, infusion of inert gas into ballast water, control of aquatic nuisance species, bubbling of inert gas through and into ballast water, and elevated $CO_2$ levels in ballast water.

2. Background of the Invention 2.1 Aquatic Nuisance Species Present in Ship's Ballast Water It is estimated that 21 billion gallons of ballast taken on in foreign ports are discharged by commercial vessels annually in the waters of the United States (Carlton et al. 1993). Ballast water transport is a major vector for introduction of potentially invasive aquatic species.

Standards for treatment of ballast water are still in a state of flux. Efforts to define standards are ongoing in the US Congress, International Maritime Organization (IMO), and other individual maritime nations. The US Congress (NAISA 2002) proposes an Act that will, among other considerations, set the interim standards for ballast water treatment (BWT). It stales, "The interim standard for BWT shall be a biological effectiveness of 95% reduction in aquatic vertebrates, invertebrates, phytoplaokton and macroalgae." There are discussions about setting micron standards, i.e. x microns cut-off for living organisms. Currently, a fifty (50) micron standard is being discussed in various circles, including IMO and US Coast Guard. The default standard appears to be the Ballast Water Exchange (BWE), or something close to it. Cangelosi (2002) states " . . . the Coast Guard has set forth a "do-it-yourself" approach, directing interested ship owners to conduct complex shipboard experiments (post-installation) to undertake direct and real-time comparisons between BWE and treatment. If the comparison is favorable and defensible, the Coast Guard will approve the treatment. See Cangelosi, Allegra (Nov. 14, 2002). Testimony Before the Joint Committee on Resources and Science of the U.S. House of Representatives.

2.1 Control of Aquatic Nuisance Species Present in Ship's Ballast Water

Glosten (2002) provides a review of the numerous treatment systems for the control of aquatic nuisance species in ship's ballast water. These systems include heat, cyclonic separation, filtration, chemical biocides, ultraviolet light radiation, ultrasound, and magnetic/electric field. See Glosten-Herbert-Hyde Marine (April, 2002). "Full-Scale Design Studies of Ballast Water Treatment Systems", Prepared for Great Lakes Ballast Technology Demonstration Project.

Known methods not mentioned in this reference are hypoxia, carbonation, and their combination. In studies of 18 months duration on a coal/ore vessel (Tamburri et al. 2002), the ballast water dissolved $O_2$ level was reduced and held to concentrations at or below 0.8 mg/l by bubbling essentially pure nitrogen. See Tamburri, M. N., Wasson K., and Matsuda, M. (2002). Ballast water deoxygenation can prevent aquatic introductions while reducing ship corrosion. Biological Conservation. 103, 331–341. The experiments resulted in a treatment "that can dramatically reduce the survivorship of most organisms found in the ballast water . . . "

In extensive experiments with gas of varying percent $CO_2$, $N_2$ and $O_2$ (McMahon, et al. 1995), the " . . . results indicate that $CO_2$ injection may be an easily applied, cost-effective, environmentally acceptable molluscicide for mitigation and control a raw water system macrofouling by Asian clams and zebra mussels". See McMahon, R. F., Matthews, M. A., Shaffer, L. R. and Johnson, P. D. (1995). Effects of elevated carbon dioxide concentrations on survivorship in zebra mussels (Dreissena polymorpha) and Asian clams (Corbicula fluminea). In The fifth international zebra mussel and other aquatic nuisance organisms conference, pp. 319–336. Toronto, Canada.

2.3 Corrosion Considerations of Various Ballast Water Treatment Systems

Shipboard corrosion mitigation is always a priority consideration. It requires the continual attention of the crew and, if not carefully controlled, can actually compromise the strength of the ship. Any installed ballast water treatment system must not under any circumstances increase the potential for corrosion, and if possible, should decrease the potential. The present invention will be seen to have considered the corrosion issue.

As reported in literature Tamburri et al. (2002), corrosion might even be mitigated by deoxygenation. See Tamburri, M. N., Wasson K., and Matsuda, M. (2002), op cit.

Perry, et al. (1984) state that unless pH level drops below 4 concerns about corrosion are unfounded. See Perry, R. H., Green, D. W., Maloney, G. O. Perry's Chemical Engineer's Handbook, 5th Ed., McGraw Hill, 1984.

2.4 The Theory of Ballast Water Treatment by Anoxia and/or Hypoxia

Except for ballast water exchange, essentially all treatment concepts involve the chemical change of the water to cause an environment lethal for ANS. The chemical changes described in Tamburri et al. (2002) and McMahon (1995) offer promising results, i.e., reduce the dissolved $O_2$ in the one case, and carbonate and reduce the pH in the other case. See Tamburri, M. N., Wasson K., and Matsuda, M. (2002), op cit. See also McMahon, R. F., Matthews, M. A., Shaffer, L. R. and Johnson, P. D. (1995), op cit.

In both cases the process involves the exchange of gases, the extraction of the dissolved $O_2$ and the introduction of $CO_2$. Surface contact area and partial pressure differentials permit the gas exchanges to occur. The deoxygenation of the ballast water is based on Henry's Law of gas solubility: The relative proportion of any dissolved gas including oxygen in the ballast water is a function of the concentration, equivalent to partial pressure of the gas (e.g. oxygen), within the mixed gases over the ballast water. The depletion of oxygen in the ballast water is primarily a function of the shared surfaces and concentrations at the interfaces of the inert gases and water.

The pH of the ballast water is lowered by the chemical reaction:

$$CO_2+H_2O \rightarrow H_2CO_3 \leftrightarrows H^+ + HCO_3^-$$

This equation is interpreted that carbon dioxide ($CO_2$) reacts with water ($H_2O$) to form carbonic acid ($H_2CO_3$), which then partially dissociates to form hydrogen ($H^+$) and bicarbonate ions ($HCO_3^-$).

All systems described thus far in the literature, including ballast transfer, have left untreated the sediment buildup in the bottom of the tanks. If the orifices in the lattice work of piping were to point down, then the sediment could potentially be stirred up, facilitating the killing of the embedded ANS.

2.2 Ballast Water Treatment in the Related Predecessor Patent Application

The user of gaseous underpressure in the treatment of ship's ballast water so as to combat Aquatic Nuisance Species (ANS) invasion resulting from ballast water discharge, described in this application, is an extension of American Underpressure System (AUPS) of MH Systems, San Diego, Calif. The AUPS utilizes a slight negative pressure in the tank's ullage space, in an inert environment, to prevent or minimize oil spillage from tankers (Husain et al. 2001). See Husain, M., Apple, R., Thompson, G. and Sharpe, R. (2001); Full Scale Test, American Underpressure System (AUPS) on USNS Shoshone, presented to Northern California Section, SNAME, September 2001.

The American Underpressure System (AUPS) is the subject of U.S. Pat. No. 5,156,109 for a System to reduce spillage of oil due to rupture of ship's tank, and U.S. Pat. No. 5,092,259 for Inert gas control in a system to reduce spillage of oil due to rupture of ship's tank. It is also the subject of related U.S. Pat. No. 5,343,822 for Emergency transfer of oil from a ruptured ship's tank to a receiving vessel or container, particularly during the maintenance of an under-pressure in the tank; U.S. Pat. No. 5,323,724 for a Closed vapor control system for the ullage spaces of an oil tanker, including during a continuous maintenance of an ullage space underpressure; and U.S. Pat. No. 5,285,745 for System to reduce spillage of oil due to rupture of the tanks of unmanned barges. All patents are to the selfsame inventor Mo Husain who is one of the co-inventors of the present invention.

The AUPS is retrofittable on existing tankers, and has the similar spill avoidance capability as that of a double hull tanker during accidental rupture of the hull. The AUPS spill avoidance system creates a slight vacuum (two to four pounds per square inch) in each cargo tank. This vacuum, assisted by the outside hydrostatic pressure of the surrounding water, prevents or minimizes cargo loss in the event of hull rupture. In case of a bottom rupture caused by grounding, nearly all of the cargo can be protected. In the case of side hull damage, cargo below the level of the damage will be lost, while the cargo above the side hull rupture will be protected.

This system can be used in conjunction with existing inert gas systems that are mandatory on most tankers to prevent explosions. The AUPS consists essentially of exhaust blowers with their isolation and control valves tapping into the inert gas system. A negative pressure of inert gas is created in the ullage space—the volume of gas above the oil. This negative pressure or underpressure is continuously adjusted and prevents oil from spilling if the tanker is ruptured. Stated simply, the oil is held in the tank by the slight underpressure.

This partial vacuum, or underpressure, assisted by the outside hydrostatic pressure of the surrounding water, prevents or minimizes cargo loss in the event of hull rupture. In case of a bottom rupture caused by grounding, nearly all of the cargo can be protected. In the case of side hull damage, cargo below the level of the damage will be lost, while the cargo above the side hull rupture will be protected.

This negative pressure or underpressure is continuously adjusted and prevents oil from spilling if the tanker is ruptured. Again stated simply, the oil is held in the tank by the slight underpressure.

As of 2003, the environmental threat posed by oil tanker accidents has mandated the use of double-hull construction. However, the phase-out of conventional "single-skin" tankers may last to 2015. One goal of the AUPS system, including as is modified and enhanced by the present invention, has been and remains, circa 2003, to provide the protection until all existing single-skin tankers visiting U.S. ports are retired.

The present patent application is also related as a Continuation-in-Part to U.S. patent application Ser. No. 10/120,339 filed on May 9, 2002, for CLOSED LOOP CONTROL OF BOTH PRESSURE AND CONTENT OF BALLAST WATER TANK GASES TO AT DIFFERENT TIMES KILL BOTH AEROBIC AND ANAEROBIC ORGANISMS WITHIN BALLAST WATER to inventor Henry Hunter assigning to the same MH Systems, San Diego, Calif., that is the assignee of the present invention. That application is itself a Continuation-In-Part (C-I-P) of U.S. patent application Ser. No. 09/865,414 filed May 25, 2001, for CLOSED LOOP CONTROL OF VOLATILE ORGANIC COMPOUND EMISSIONS FROM THE TANKS OF OIL TANKERS, INCLUDING AS MAY BE SIMULTANEOUSLY SAFEGUARDED FROM SPILLAGE OF OIL BY AN UNDERPRESSURE SYSTEM, now issued as U.S. Pat. No. A,AAA,AAA.

As a simplified basis of comparison, the first related predecessor application may be considered to teach the control of oxygen in ship's ballast water maintained under a pressure less than atmosphere for the inducement, at different times, of both such (i) oxygen-starved and (ii) oxygen-rich conditions as are respectively fatal (i) to aerobic marine organisms (by action of hypoxia), and (ii) to anaerobic marine organisms (by action of exposure to high levels of dissolved oxygen).

Meanwhile, the present application will be seen to teach the inducement of each of (i) carbon dioxide-rich, (ii) acid-enhanced and/or (iii) oxygen-starved conditions in ship's ballast water—preferably as is continuously maintained under a pressure less than atmosphere pressure—so as to induce, at one and the same time, (i) hypercapnic, (ii) acidic and/or (iii) hypoxic conditions that are fatal to both aerobic, and anaerobic, marine organisms.

SUMMARY OF THE INVENTION

The present invention contemplates the infusion of inert, or combustion, gases into ballast water—preferably as is maintained under less than atmospheric pressure—in order to kill harmful aquatic nuisance species by simultaneous, synergistic, inducement of (1) hypercapnia (elevated concentration of dissolved $CO_2$), (2) hypoxia (depressed concentration of dissolved $O_2$), and (3) acidic pH level. The inert combustion gases may be obtained, for example, from (i) a ship's inert gas generator (of the Holec, or equivalent types), and/or from (ii) ship's own flue gases. These gases are highly noxious, having $CO_2$ significantly increased and $O_2$ significantly depleted, from normal atmospheric levels. An air-breathing animal—not only humans, but lower animals—would soon be stifled by these gases. Thus one way to think about the prophylactic action of present invention is to consider that the present invention effectively and efficiently alters the mixture of atmospheric gases, including oxygen ($O_2$), that normally are dissolved in ballast water in favor of, predominantly, carbon dioxide ($CO_2$). Aquatic marine organisms—at least of the aerobic types—can scarcely tolerate these noxious gases any better than can air-breathing animals, and a widespread and severe die-off of multiple marine organisms, is experienced in the presence of these noxious gases dissolved in sea water.

1. The Present Invention Starts With Inducing (1) Hypercapnia, and, in Association with Elevated $CO_2$, (2) Depressed pH The present invention contemplates the control of Aquatic Nuisance Species (ANS) present in the ballast water of ship's ballast tanks by action of inducing hypercapnia (fatally elevated $CO_2$ levels) in marine organisms present within the ballast water. The same elevated $CO_2$ levels as induce hypercapnia also serve to acidify the sea water.

This condition of enhanced dissolved $CO_2$—which is of an extreme level such as strongly induces hypercapnia in marine organisms—is, in accordance with the present invention, preferably realized by infusion of a mixture gases into the seawater, which gaseous mixture is preferably enhanced in $CO_2$ to $\geqq 11\%$ by molar volume and, more preferably, to $\geqq 15\%$ by molar volume. In accordance with the invention, these gases enhanced in $CO_2$ are preferably realized as the gaseous output of a standard shipboard inert gas generator (commonly called a Holec generator, after the major manufacturer thereof) (which output is commonly about 84% Nitrogen, 12–14% $CO_2$ and 2% Oxygen), and/or as a ship's own flue gases. These preferred $CO_2$ concentrations may be compared with, by way of example, published studies of hypercapnia in marine organisms that have generally investigated introduction of gaseous mixtures having $CO_2$ concentrations in the range from 0.1% to 1%. In accordance with the present invention, effective delivery of the gases high in $CO_2$ concentration into ballast water will be realized by bubbling these gases into a ballast water from the bottom of a ballast water tank that is maintained at pressure less than atmosphere (called an "underpressure" in this and in related patent applications)—but this aspect of the invention will be further dealt with later.

The infusion of the gases enhanced in percentage $CO_2$ is preferably continued until dissolved $CO_2$ in the ballast water is raised to $\geqq 20$ ppm, and more preferably to $\geqq 50$ ppm.

Dissolved $CO_2$ of this level serves to acidify sea water. The chemical mechanism by which enhanced dissolved $CO_2$ acidifies seawater is well established, and is:

$$CO_2+H_2O \rightarrow H_2CO_3 \leftrightarrows H^+ + HCO_3^-$$

Dissolved $CO_2$ of the preferred levels of $\geqq 20$ ppm reduces the pH of seawater, which is normally 8, to acidic levels of $pH \leqq 7$, and, preferably, $pH \leqq 6$ and still more preferably $pH \leqq 5.5$.

It is hard to tell whether the dissolved $CO_2$ at concentrations $\geqq 20$ ppm, or the acidic levels of $pH \leqq 7$, are more injurious to the ANS—being that both are related—but research indicates that both factors are individually effective in killing ANS, and both factors together appear to be usefully synergistic in killing ANS.

2. The Present Invention Continues With Inducing (3) Hypoxia in Aquatic Nuisance Species Present in Ballast Water Still further, the present invention contemplates not to stop with simply inducing conditions in ballast water that are both hypercapnic and acidic to ANS—injurious and fatal to ANS as these conditions alone may be—but to continue by depriving these ANS of oxygen at the same time. In particular, this extension and enhancement of the present invention is based on the recognition that (i) aquatic nuisance species present in ship's ballast water may best be controlled by a combination of hypoxic, hypercapnic and acidic conditions within the ballast water, and that (ii) these conditions may be simultaneously economically realized by bubbling gases from an inert gas generator, and/or the flue gases of the ship, through the ballast water, preferably as the ballast water is maintained under a pressure less than atmosphere. The preferred levels of dissolved $CO_2$ (i.e., preferably $\geqq 20$ ppm, and more preferably to $\geqq 50$ ppm), and the preferred pH levels (i.e., to $pH \leqq 7$, and, preferably, $pH \leqq 6$ and still more preferably $pH \leqq 5.5$), have already been stated. In accordance with the present invention, the oxygen content of a gaseous mixture that infused with ballast water is preferably $\leqq 4\%$ $O_2$, and is more preferably $\leqq 3\%$ $O_2$, and this infusion of is continued until a dissolved oxygen level of, preferably, $\leqq 1$ ppm $O_2$ and, more preferably, $\leqq 0.8$ ppm $O_2$ is induced.

Importantly to understanding the present invention, it should be appreciated that the most preferred method of the invention is managing at least three different conditions—each of two dissolved gases, and acidity/alkalinity—all at the same time.

To appreciate that the conditions are separate, and separately managed, understand to begin with that hypoxia, or lack of oxygen, implies neither hypercapnia—an excess of carbon dioxide—nor acidity—a pH less than seven. For example, oxygen present in ullage space gases and/or as a dissolved gas in ballast water may be replaced with nitrogen without appreciable effect on either (i) the dissolved carbon dioxide within, or (ii) the pH balance of, the ballast water.

Likewise, it should be understood that hypercapnia, or an excess of carbon dioxide, does not mandate hypoxia, nor an acidic pH. For example, the carbon dioxide level in the enclosed atmosphere of a submarine can, as a product of human respiration, rise to high levels but that it is "scrubbed" from the atmosphere. The build-up of $CO_2$ can transpire in an enclosed space nonetheless that the atmosphere may constantly contain copious oxygen (derived on a nuclear submarine from the electrolysis of water with electricity).

Finally, even when carbon dioxide is added to water—as it sometimes is by aquarists to promote the lush growth of aquatic plants—this augmentation of dissolved $CO_2$ gas need not result in decreased pH (increased acidity) of the water (by the same chemical mechanism as occurs in the present invention) if, as is often the case, any lowering of the pH level is counteracted by the addition of a chemical base such as, most commonly, lime.

Accordingly, even though the three conditions of (1) hypoxia, (2) hypercapnia and (3) reduced pH, or acidity, will be seen to be relatively straightforwardly realized by the preferred methods and system of the present invention by the addition of but a single mixture of gases all at the same time, these three conditions within ballast (or other waters) are not simply happenstantially achieved, but are instead, in accordance with the teaching of the present invention, intentionally realized.

3. The Present Invention Realizes Gaseous Exchange in Ballast Water Efficiency, and Effectively Importantly to economically, and practically, realizing the most preferred—ANS-killing—conditions within a ship's ballast water, the preferred ballast water treatment method in accordance with the present invention consists of (i) bubbling an oxygen-depleted, $CO_2$-enhanced, inert gas mixture via a row of pipes (orifices at the bottom of the pipes) located at the bottom of a ballast water tank, while (ii) maintaining a negative pressures of −2 psi at the ullage space of the same ballast water tank.

As explained in the first related predecessor patent application, the bubbling at, and during, an underpressure in the ballast water tanks makes that (some) exchange of dissolved gases is realized by (i) outgassing as transpires over the huge combined surface area of the bubbles, as opposed to (ii) mere slow diffusion of dissolved gases through the ballast water, with gaseous interchange occurring essentially only at the surface layer of the tank.

The inert gas is preferably from a standard shipboard inert gas generator (commonly called a Holec generator), and is commonly composed of about 84% Nitrogen, 12–14% $CO_2$ and 2%–4% Oxygen. In accordance with the present invention, the ballast water is equilibrated with gases from the inert gas generator. As a result, the water will become hypoxia, will contain $CO_2$ levels much higher than normal, and the pH will drop from the normal pH of seawater (pH 8) to approximately pH 6.

Ballast water treatment in accordance with the present invention has undergone preliminary laboratory tests at the Scripps Institution of Oceanography, La Jolla, Calif. USA, and has realized the results reported in this specification.

4. A Method of Killing Aquatic Nuisance Species in Ship's Ballast Water by Hypercapnia, or Combined Hypercapnia and Hypoxia Therefore, in one of its aspects the present invention is embodied in a method of killing aquatic nuisance species in ship's ballast water. The base method consists simply of infusing carbon dioxide into the ship's ballast water at a level effective to kill aquatic nuisance species by hypercapnia.

The infusing is preferably with a gaseous mixture of ≧11% carbon dioxide by molar volume. This infusing with the gaseous mixture of ≧11% carbon dioxide preferably transpires until the ballast water is hypercapnic to ≧5 ppm dissolved carbon dioxide. This infusing preferably transpires by bubbling the gaseous mixture through the ballast water, and more preferably by bubbling of the gaseous mixture is through the ballast water that is under less than atmospheric pressure. In particular, the ballast water under less than atmospheric pressure is preferably located within ballast water tanks of the ship where ullage space gas pressure is −2 p.s.i. below atmospheric pressure, or lower.

The base method is preferably expanded, or enlarged, to include concurrently depleting oxygen in the ship's ballast water at a level effective to kill aquatic nuisance species by hypoxia.

In this expanded method the infusing is preferably like as in the base method, with the depleting preferably transpiring by substitution of gases, including oxygen gas dissolved in the ballast water, with a gaseous mixture of ≦4% oxygen. This depicting with a gaseous mixture of ≦4% oxygen preferably transpires until the ballast water is hypoxic to ≦1% ppm dissolved oxygen.

As with the infusing, the depleting transpires by bubbling the gaseous mixture through the ballast water. This bubbling of the gaseous mixture is again through the ballast water that is under less than atmospheric pressure, and is more preferably through ballast water within ballast water tanks of the ship where tank ullage space gas pressure is −2 p.s.i. below atmospheric pressure, or lower.

In either the base, or the expanded, method, the infusing and/or the depleting may be, and preferably is, accompanied by acidifying of the ship's ballast water at a level effective to kill aquatic nuisance species.

This acidifying is a consequence of the infusing where, as is preferred, the infusing is with a gaseous mixture of ≦11% carbon dioxide by molar volume. In this case the acidifying is then concurrently realized by the chemical reaction $$CO_2+H_2O \rightarrow H_2CO_3 \Leftrightarrow H^+ + HCO_3^-.$$

More particularly, the infusing with the gaseous mixture of ≧11% carbon dioxide preferably transpires until both (1) the ballast water is hypercapnic to ≧20 ppm carbon dioxide, and (2) the same ballast water is acidic to pH≦7.

As before, the infusing and, consequent to the infusing, the acidifying preferably transpires by bubbling the gaseous mixture through the ballast water, and more preferably through the ballast water that is under less than atmospheric pressure, most preferably −2 p.s.i. below atmospheric pressure, or lower.

Likewise that the infusing (of $CO_2$) preferably transpires the same in the basis, and in the extended, methods, so also does the depleting (of $O_2$) preferably transpire the same even when the consequence of the depleting is measured in the acidification, or the lowering of the pH of the ballast water, instead of, or in addition to, the inducing of hypercapnic and/or hypoxia conditions.

Further likewise, the depleting (of $CO_2$) and/or the depleting (of $O_2$) preferably transpires by the same bubbling process, most preferably into ballast water at less than atmospheric pressure, when the consequence of the depleting is measured in the acidification, or the lowering of the pH of the ballast water, instead of, or in addition to, the inducing of hypocapnic and/or hypoxia conditions.

In simple terms, the process steps of the present invention are consistent, and synergistic. Everything works together, in concert and to the same end: the killing of aquatic nuisance species in ship's ballast water.

5. A Quantitative Method of Reducing Survival of Aquatic Nuisance Species in Ship's Ballast Water In another of its aspects the present invention may be considered to be embodied in a quantitative method of reducing survival of aquatic nuisance species in ship's ballast water that is, in the preferred parameters of its conduct, quite unlike any prior art with which the inventors are acquainted. In simple terms, the method of the present invention renders ballast water triply deadly to aquatic nuisance species due to each of hypoxia, hypercapnic and acidic conditions.

In the preferred method a gaseous mixture consisting essentially of ≧80% nitrogen, ≧11% carbon dioxide and ≦4% oxygen through ship's ballast water until the ballast water is permeated to equilibrium with these gases, at which time the ballast water will be hypoxia to ≦1 ppm oxygen, hypercapnic to a ≧20 ppm carbon dioxide, and acidic to pH≦7.

The permeated gaseous mixture is preferably the output of a marine inert gas generator. This gaseous mixture that is output from a marine inert gas generator consists essentially of nitrogen in the range from 87% to 84% mole percent, carbon dioxide in the range from 14% to 11% mole percent, and oxygen in the range from 2% to 4% mole percent.

Regardless of the particular ratios of the gaseous components of the gaseous mixture, the permeation is most preferably continued until the ship's ballast water until the ballast water is hypoxic to ≦0.8 ppm oxygen, hypercapnic to ≧50 ppm carbon dioxide, and acidic to pH≦6.

As will by now be familiar, the gaseous mixture is preferably permeated to equilibrium within the ballast water by being bubbled through the ballast water, and more preferably through ballast water that is at a pressure less than atmosphere.

6. A System for Reducing Survival of Aquatic Nuisance Species in Ship's Ballast Water In yet another of its aspects, the present invention is embodied in a system for reducing survival of aquatic nuisance species in ship's ballast water.

The preferred system includes (1) a gas generator producing a gaseous mixture enhanced in carbon dioxide relative to both (i) atmospheric proportion of carbon dioxide, and (ii) proportion of carbon dioxide that is dissolved in sea water, (2) piping having and defining discharge orifices at the base of, and inside, the ship's ballast water tank; and (3) a compressor pressuring the gaseous mixture received from the gas generator sufficiently so that, as delivered to the piping, it will be forced out the discharge orifices and bubble upward through the ballast water.

In this system gaseous interchange transpires between (i) the gaseous mixture, enhanced in carbon dioxide, that is within the bubbles and (ii) dissolved gases within the ballast water. This gaseous interchange transpires until dissolved gases within the ballast water will become enhanced in carbon dioxide to a level inducing hypercapnia in aquatic nuisance species within the ballast water.

In this basic system the gas generator preferably produces a gaseous mixture having ≧11% carbon dioxide by molar volume.

This basic system is preferably expanded and enhanced by causing that the same gas generator producing the gaseous mixture enhanced in carbon dioxide also produces the gaseous mixture that is concurrently diminished in oxygen over both (i) atmospheric proportion of oxygen, and (ii) proportion of oxygen dissolved in sea water. The gas generator is thus called an "inert" gas generator.

In this expanded, and enhanced, system the gaseous interchange transpiring between (i) the gaseous mixture, diminished in oxygen, that is within the bubbles and (ii) the dissolved gases within the ballast water, causes dissolved gases within the ballast water to become diminished in oxygen to a level inducing hypoxia in aquatic nuisance species within the ballast water.

The inert gas generator preferably produces a gaseous mixture having ≧11% carbon dioxide by molar volume, and, most preferably, ≦4% oxygen by molar volume.

In either the basic, or the expanded and enhanced, systems a blower preferably evacuates gases from within the ullage space of the ship's tank so as to produce a pressure therein which is at least 2 p.s.i. less than prevailing atmospheric pressure outside the tank.

The piping preferably includes a matrix of piping in a grid array at the base of, and inside, the ship's ballast water tank. Discharge orifices of this piping are variously directed both upwards toward the top and the tank and downwards towards the base of the tank.

The compressor preferably produces a pressure more than 2 p.s.i. greater than a hydrostatic pressure then prevailing at the base of the ship's ullage tank.

Considering the amount and constituents of gas produced by the inert gas generator, pressured by the compressor, and delivered to the piping to be bubbled upwards through the ballast water, the system preferably serves to render the ballast water hypoxic to ≦1 ppm oxygen, hypercapnic to ≧20 ppm carbon dioxide, and acidic to pH≦7.

This is achieved at a rate that will, most preferably, permit the entire maximum ballast water of a ship to be treated to these levels in a period less than, most preferably, one-half the normal voyage duration of the ship minus the required time for aquatic nuisance species to die to the 90% level. This is only to say that the shipboard ballast water gaseous infusion system is sized to (i) the task at hand, (ii) the time available for the completion of the task, and (iii) the resilience to die off (from hypercapnia, anoxia and acidic conditions) of the ANS to hand, all at an adequate safety margin. Most typically all the ballast water on a ship will be treated so as to reach desired dissolved gas levels in less than, most preferably, one day, and will be held at those levels for, most preferably, at least two days, and more commonly more than four days. It is, or course, totally acceptable and beneficial to hold the conditions that kill ANS for weeks and longer, should the usage of the ship and its ballast tanks so permit. There is no harm incurred in dumping ballast water having those gas concentrations that are, in accordance with the present invention, different from normal seawater into the sea, where the evacuated ballast water is so quickly diluted that it is not deemed capable of harming even the most delicate marine organisms proximate the release point.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 2 is a Table 1 containing data on the effects of an "inert gas", called trimix and being a commercially available gas mixture of 2% oxygen, 12% $CO_2$ and 84% nitrogen resembling the gas generated by commercially used marine "inert gas generators", on marine organisms commonly regionally identified as aquatic nuisance species.

FIG. 3 is a Table 2 containing data on the capacities of the ballast water tanks of an exemplary ballast water treatment system in accordance with the present invention.

FIG. 4b shows a schematic diagram of the preferred embodiment of a ship's ballast water treatment system in accordance with the present invention the tank of which was previously seen in FIG. 4a.

FIG. 6, consisting of FIGS. 6a and 6b, is a Table 3 listing the principal parts and materials together with estimated prices and labor costs, circa 2003, in the exemplary ballast water treatment system in accordance with the present invention.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. The Preferred Ballast Water Treatment Method of the Present Invention

The purpose of the experiments described here was to obtain data on the effects of "inert gas" on marine organisms. "Inert gas" of a mixture hereinafter called trimix—a commercially available gas mixture of 2% oxygen, 12% $CO_2$ and 84% nitrogen resembling the gas generated by commercially used marine "inert gas generators"—was used. Both adult and young adult marine organisms were chosen for two reasons: a) to make the size of specimens amenable for the experimental setup and b) to raise the significance of possible effects since adults of a species are typically more tolerant of environmental changes than juveniles or larvae. All marine organisms were collected fresh from the coastal waters off La Jolla, Calif. and used immediately. They are, in that particular environment, not necessarily nuisance organisms. Some of the organisms might be so considered, however, should they be introduced into other waters. The plankton sample was collected with a plankton net from a small boat.

Figure 1:
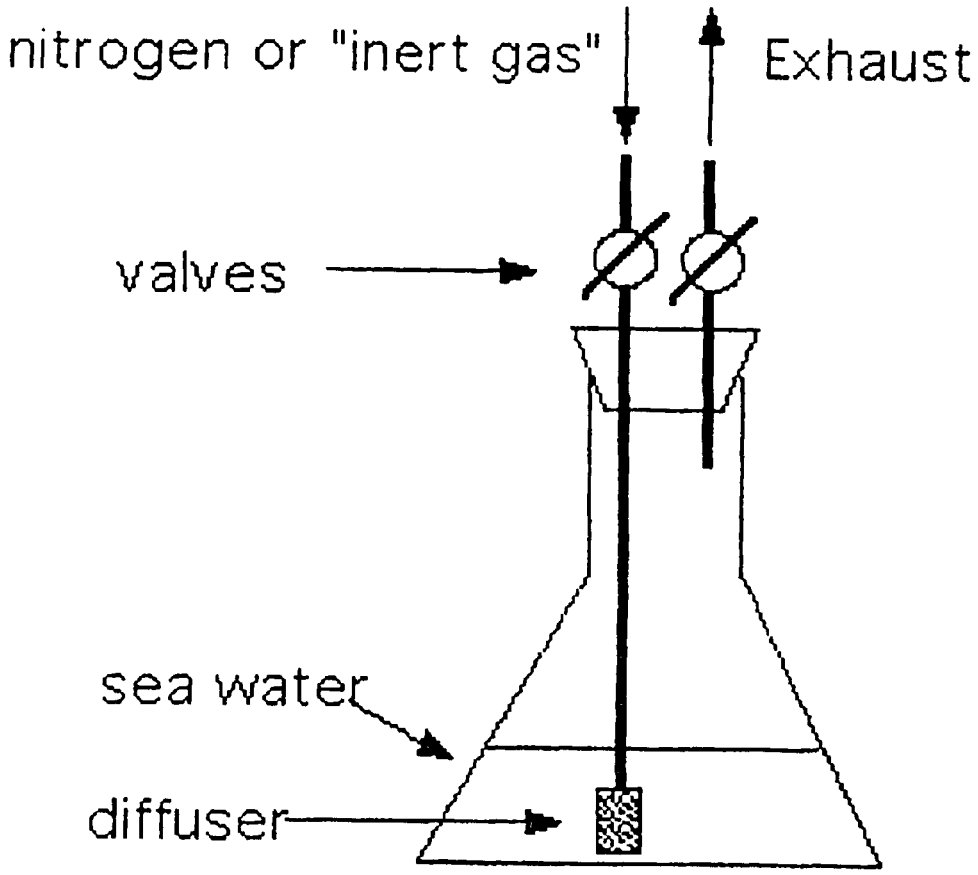
FIG. 1 shows a schematic of an experimental setup consonant with the principles, system and methods of the ballast water treatment of the present invention.

The schematic of an experimental setup in validation of the principles and methods of the present invention (and also, a miniature scale, the gaseous exchange system) is shown in FIG. 1. Three parallel incubations were done for each experiment. Several organisms were incubated in 1.5 l of seawater at 22° C. in large Erlenmeyer flasks. Each incubation was equilibrated with the respective gas using aquarium stones before any organisms were introduced. The aerobic control was bubbled from an aquarium pump for approximately 15 min and left open to the atmosphere after addition of specimens. An anaerobic incubation was bubbled with 99.998% nitrogen for 15 min. After introduction of the organisms, the bubbling was continued for another 10 min and then the container was closed with a rubber stopper or the bubbling was continued. The incubation in trimix was treated similarly except that the gas mix was used instead of nitrogen. The oxygen concentrations were measured after the initial bubbling period using a Strathkelvin oxygen electrode with a Cameron instruments OM-200 oxygen analyzer. Values of pH were determined using a combination electrode and a Radiometer pH meter.

Survival of the marine specimens was determined visually by checking for motile responses to tactile stimulus (e.g. mussels do not close their shells, barnacles to not withdraw their feet, shrimp do not move their mouthparts, worms appear limp and motionless). After each testing of the animals, the incubation flasks were bubbled for 10 min to reestablish original conditions. To verify mortality of the specimens, they were relocated to aerobic conditions and checked again after 30 min. If they still did not respond, they were considered dead.

This setup permitted comparison of responses to both nitrogen and "trimix" while making sure that test specimens were not gravely affected by other experimental parameters. Incubation in pure nitrogen permitted comparison with published results by others.

2. Results

The oxygen concentrations were measured at "non-detectable" for the nitrogen incubations and 10% air saturation (=16 Torr partial pressure) for the "trimix". The pH value of the water bubbled with trimix reached pH 5.5 after the initial 10 min. of vigorous bubbling. The aerobic and nitrogen bubbled seawater maintained their pH at 8. The incubations showed clearly that "trimix" kills organisms considerably faster than incubations in pure nitrogen. See Table 1 of FIG. 2.

The shrimp and crabs incubated in "trimix" were dead after 15 min and 75 min, respectively. Even a transfer into aerated water did not result in any movement. The brittle stars incubated under nitrogen started to move again after transferred into aerated water. All the mussels incubated in nitrogen and "trimix" were open after 95 min but only the ones in nitrogen still responded to tactile stimuli by closing their shells. The barnacles were judged dead after incubation in "trimix" when they did not withdraw their feet when disturbed, the ones incubated in nitrogen still behaved normally. The plankton sample mainly contained copepods. They stopped moving after 15 min and could not be revived in nitrogen and "trimix" incubations. The results are summarized in Table 1 of FIG. 2, showing the effects of trimix on marine species where the trimix is 2% oxygen, 12% $CO_2$ and 86% nitrogen.

3. Discussion

Low oxygen concentrations in water are a common natural phenomenon and their effects on live organisms have been widely discussed in the past. Oxygen may not be available to an organism because no water for respiratory purposes is present, e.g., during low tide in the intertidal zone. Oxygen may also be removed in stagnant waters due to bacterial or other "life based" actions, e.g., in ocean basins, fjords, tide pools, or in waters with high organic content and consequently high bacterial counts, e.g., in sewage, mangrove swamps, paper mill effluent. In addition, oxygen can also be removed by chemical reactions, e.g., in hot springs, industrial effluents. The manuscript by Tamburri et al. (2000) summarizes survival of a variety of larvae and adults of organisms including some which may be significant as "nuisance species" under hypoxic conditions. See Tamburri, M. N., Peltzer, E. T., Friederich, G. E., Aya. I., Yamane, K. and Brewer, P. G. (2000). A field study of the effects of CO2 ocean disposal on mobile deep-sea animals. Mar. Chem. 72, 95–101.

The publication supports extensively that most organisms only survive strongly hypoxic conditions for a few hours and only a few adults for several days. The authors suggest that 72 h. of hypoxia will be sufficient to kill most eucaryotic organisms, adults or larvae in ballast water.

The effects of high $CO_2$ on organisms in natural waters have become a research focus because of proposals to dispose atmospheric $CO_2$ in the deep ocean (Haugan 1997, Omori et al. 1998, Seibel and Walsh 2001). See Haugan, P. M. (1997). Impacts on the marine environment from direct and indirect ocean storage of CO2. Waste Management 17, 323–327. See also Omori, M., Norman, C. P. and Ikeda, T. (1998). Oceanic disposal of CO2: Potential effects on deep-sea plankton and micronekton—a review. Plankton Biol. Ecol. 45, 87–99. See also Seibel, B. A. and Walsh, P. J. (2001). Potential impacts of CO2 injection on deep-sea biota. Science 294, 319–320.

Two effects have to be distinguished when looking at "trimix" incubations in seawater: a) the lowering of the pH from pH 8 to about pH 5.5 and b) the raised $CO_2$ concentrations in the water. While the pH change caused by the incubations in "trimix" are in the range of published experiments, the $CO_2$ concentration in "trimix" (about 14%) is much higher than those investigated in the published literature (generally about 0.1% to 1%). Therefore, the hypercapnic effects of "trimix" incubations should be much stronger than those published previously.

Several publications have shown the detrimental effect of lower pH values and high $CO_2$ levels on aquatic life. In a recent publication, Yamada and Ikeda (1999) tested ten oceanic zooplankton species for their pH tolerance. See Yamada, Y. and Ikeda, T. (1999). Acute toxicity of lowered pH to some oceanic zooplankton. Plankton Biol. Ecol. 46, 62–67.

They found that the $LC_{50}$ (=pH causing 50% mortality) after incubations of 96 hours was between pH 5.8 and 6.6 and after 48 h. it was between pH 5.0 and 6.4. Therefore, the pH value caused by incubations with "trimix" is well within the lethal range for this zooplankton. Huesemann, et al., (2002) demonstrate that marine nitrification is completely inhibited at a pH of 6. See Huesemann, M. H., Skilmann, A. D. and Crecelius, E. A. (2002). The inhibition of marine nitrification by ocean disposal of carbon dioxide. Mar. Poll. Bull. 44, 142–148.

Larger organisms were also investigated. A drop in seawater pH by only 0.5 diminishes the effectiveness of oxygen uptake in the midwater shrimp Gnathophausia ingens (Mickel and Childress 1978). Deep sea fish hemoglobin may even be more sensitive to pH changes (Noble et al. 1986). See Mickel, T. J. and Childress, J. J. (1978), The effect of pH on oxygen consumption and activity in the bathypelagic mysid Gnathophausia ingrens. Bio. Bull. 154, 138–147. See also Noble, R. W., Kwiatkowski, L. D., De Young, A., Davis, B. J., Haedrieh, R. L., Tam, L. T. and Riggs, A. F. (1986). Functional properties of hemoglobins from deep-sea fish correlations with depth distribution and presence of a swim bladder. Biochem. Biophys. Acta 870, 552–563.

It appears that a common metabolic response to raised $CO_2$ levels and concomitant lowered pH is a metabolic suppression (Barnhart and McMahon 1988, Rees and Hand 1990). See Barnhart, M. C. and McMahon, B. R. (1988). Depression of aerobic metabolism and intracellular pH by hypercapnia in land snails, Otala lactea. J. exp. Biol. 138, 289–299. See also Rees, B. B. and Hand, S. C. (1990). Heat dissipation, gas exchange and acid-base status in the land snail Oreohelix during short-term estivation. J. exp. Biol. 152, 77–92.

Most recently, papers have been published investigating the effects of environmental hypercapnia in detail (Poertner et al. 1998, Langenbuch and Poertner 2002). See Poertner, H. O., Bock, C. and Reipschlaeger, A. (2000). Modulation of the cost of pH regulation during metabolic depression: A 31P-NMR study in invertebrate (Sipunculus nudus) isolated muscle. J. exp. Biol. 203, 2417–2428. See also Langenbuch, M. and Poertner, H. O. (2002). Changes in metabolic rate and N excretion in the marine invertebrate Sipunculus nudus under conditions of environmental hypercapnia: identifying effective acid-base variables. J. exp. Biol. 205, 1153–1160.

The infusion of trimix in accordance with the present invention combines both hypoxic and hypercapnic effects on marine organisms, including aquatic nuisance species. Preliminary results demonstrate the effectiveness of this combination in quickly killing a variety of sample organisms. Contrary to methods using additions of biocides or any chemicals in general, nothing is added to the ballast water and, therefore, nothing will be released into the environment when it is released again. Methods using radiation, heating, or filtering ballast water before or during a ship's trip, are much more expensive. The equipment needed to establish a rapid gassing of ballast water is available off the shelf and has been used in the marine environment. The plumbing and gas release equipment has been optimized and has been used in application such as aquaculture, sewage treatment and industrial uses. Extensive supporting literature and research about the design and optimization of equipment for the aeration of water is publicly available. Inert gas generators are available for fire prevention purposes on ships and other structures and are already installed on many ships, mainly tankers. They can use a variety of fuels including marine diesel to generate the inert gas.

Several considerations are relevant to a particular shipboard implementation for the treatment of ballast water with "inert gas". These include a) how are larvae, eggs, and plankton effected and b) what is the effect of trimix type inert gas in fresh water. If ballast water is taken up through a screen, larger animals will not be included. The initial tests were made with adults because of easy access to them. However, if adults of a species are effected by "inert gas" it is most likely that their larvae will also be effected probably even more so.

Empirical testing can be conducted with specimens from plankton and larval cultures and with incubations of mixed plankton collected from the ocean. Determinations of viability may be made by microscopic observations (e.g. movement of mouthparts, swimming behavior), ATP measurements (the ATP levels rapidly decreases after death of an organism), and the ability to bioluminesce (many planktonic organisms emit light, an ability which ceases after death).

Fresh water organisms are also of interest because the pH change is not as much as in seawater. Freshwater in its natural environment can have pH values around 5.5. It has to be proven that raised $CO_2$ concentrations in combination with hypoxia will also affect fresh water species. Only then can the method be used for both, fresh and salt water ballast.

4. Analysis of the System and Method of the Present Invention

In this section 4. is presented mathematical descriptions of the deoxygenation process and of the transfer of carbon dioxide into the ballast water, which, in turn, leads to lowering of the pH to the levels lethal to most ANS. Closed-form mathematical models, usable in design of a shipboard system from any set of given specifications, are presented. A list of symbols used in the equations is as follows:

Notation c concentration of carbon dioxide in the water, including ions produced by electrolytic dissociation.

g acceleration due to gravity.

h concentration of hydrogen ions in the water.

K dissociation constant of carbonic acid ($-4.3\times10^{-7}$ mol/liter).

k reaction rate constant.

$k_H$ Henry's Law constant for oxygen ($=39.79\times10^{-6}$).

N total number of bubbles generated.

n total number of gas moles in the bubble.

$n_{CO2}$ number of moles of carbon dioxide in the bubble.

$n_N$ number of moles of nitrogen in the bubble.
p total pressure inside the bubble.
$P_{CO2}$ partial pressure of carbon dioxide in the bubble.
Q gas weight flow rate.
t time.
u bubble speed.
$V_t$ volume of the tank.
x molar fraction of carbon dioxide in the bubble.
Y weight fraction of oxygen in the water.
y molar fraction of oxygen in the bubble.
ρ density of the ballast water.
Superscript $^0$ refers to quantities in the gas bubble when it is first introduced into the tank. Subscript $_0$ refers to quantities in the water at the time t=0.

The system analyzed places a mixture of nitrogen and carbon dioxide with a relatively small fraction of oxygen in contact with ballast water. The oxygen level in the ballast water is assumed to have reached equilibrium with air as a result of prolonged contact, and therefore would contain a concentration of oxygen sufficient to support a wide spectrum of life forms. The objective is to reduce the oxygen content to a low level by interchange with the gas mixture. The gas is bubbled through the ballast water, which assures uniform distribution of dissolved gas throughout the ballast tank. Thus, diffusion within the tank can be neglected. Bubbles are assumed to be small and variation of hydrostatic pressure over the vertical dimension of a bubble is neglected.

The size of bubbles and the frequency of their generation are not discussed here. These two issues are addressed in existing reference literature (see, for example, Perry et al. 1984).

The deoxygenation process is assumed to follow Henry's Law with equilibrium achieved within the residence time of each bubble. The composition of the mixture in the bubble changes primarily due to transfer of carbon dioxide, a dynamic chemical process assumed to obey the mass action kinetics.

4.1 Deoxygenation Process

As trimix gas is flushed through the system, the total weight of oxygen in the ballast water will be reduced. For the purpose of analyzing the deoxygenation process the presence of carbon dioxide in the trimix is neglected.

When a small quantity of gas, dQ, is admitted, it contains an oxygen molar fraction $y^0$. By the time this quantity of gas leaves the system it contains, according to Henry's Law, the molar fraction $Y/k_H$.

Therefore, the following differential equation is obtained:

$$\frac{dY}{dQ} = y^0 - \frac{1}{k_H}Y \tag{1}$$

Integration of this equation yields:

$$Q = k_H \ln\frac{y^0 - Y/k_H}{y^0 - Y_0/k_H} \tag{2}$$

From this equation it follows that pumping 5,200 $m^3$ of gas into a 32,200 $m^3$ tank reduces oxygen concentration to 0.83 ppm. This level of hypoxia is lethal to many ANS. With the flow rate of 38.2 $m^3$/min this can be achieved in 135 min. The relationship between the size of the tank and the time required to deoxygenate it is linear. Therefore, these results can be scaled to any tank size.

Deoxygenation is enhanced by the under-pressure, as can be seen from the following simple argument. Let p be pressure of water at a given depth in the absence of under-pressure. Let $p_u$ be the absolute value of the negative pressure at the top. Let Y be the weight fraction of oxygen in the water without underpressure and $Y_u$—the same weight fraction with underpressure. Then by Henry's Law:

$$\frac{Y - Y_H}{Y} = \frac{k_H yp - k_H y(p - p_u)}{k_H yp} = \frac{p_u}{p} \tag{3}$$

From this equation it may be concluded that solubility of oxygen is reduced by underpressure. This factor becomes even more significant as a bubble rises to the surface, and the pressure inside decreases.

For example, if p=14.7 psi (the usual value at the surface of the tank) and the absolute value of the underpressure is 2 psi, then the solubility of oxygen is reduced by approximately 14%.

4.3 Carbon Dioxide Transfer in the Ballast Water

Since it is assumed that the pressure inside the bubble depends only on the pressure of the liquid surrounding it, it follows that:

$$\frac{dp}{dt} = -\rho gu,\ p = p^0 - \rho gut \tag{4}$$

By definition $n_{CO2}$+xn. Differentiating this equation realizes the following:

$$\frac{dn_{CO2}}{dt} = x\frac{dn}{dt} + n\frac{dx}{dt} \tag{5}$$

However, since the reaction of carbon dioxide with water is the dominant cause of change in the chemical composition, it can be written that:

$$\frac{dn}{dt} = \frac{dn_{CO2}}{dt} \tag{6}$$

Combining this with the Equation (5) yields the following equation:

$$n\frac{dx}{dt} - (1 - x)\frac{dn_{CO2}}{dt} \tag{7}$$

In addition, solve n=xn+$x_0$ for n to obtain:

$$n = \frac{n_0}{1 - x} \tag{8}$$

From the Law of Mass Action kinetics:

$$\frac{dn_{CO2}}{dt} = -kp_{CO2} \tag{9}$$

For the partial pressure of carbon dioxide, according to Dalton's Law $p_{CO2}$=xp.

Combining the equations (4), (7), (8), and (9) yields:

$$\frac{dx}{dt} = -\frac{k}{n_0}x(1 - x)^2(p^0 - \rho gut) \tag{10}$$

This equation can be integrated to obtain:

$$I(x) - I(x^0) = -\frac{kt}{2n_0}(2p^0 - \rho gut) \tag{11}$$

where $$I(x) = \frac{1}{1-x} + \ln\frac{x}{1-x} \tag{12}$$

This equation can be used to calculate the parameters of the systems, including residence time of a bubble, required to achieve the desired molar fraction of carbon dioxide in the bubble. The latter quantity is related to the pH and the concentration of carbon dioxide in the water, as shall be seen in the next subsection.

4.4 Concentration of Carbon Dioxide in Water and pH Calculation

Concentration of carbon dioxide in water can be determined as the ratio of the number of moles transferred from the bubble to the volume of the tank. The number of moles transferred from each bubble can be determined from the value of x as follows. By definition:

$$x = \frac{n_{CO\ 2}}{n_{CO2} + n_0} \tag{13}$$

Solving for $n_{CO2}$ gives:

$$n_{CO2} = \frac{xn_0}{1-x} \tag{14}$$

which gives the following answer for the concentration of carbon dioxide in water:

$$c = \frac{N}{V_t}\left(n^0_{CO2} - \frac{xn_0}{1-x}\right) \tag{15}$$

The concentration of the hydrogen ions in the water can be calculated from c by solving the following equation for h:

$$\frac{h^2}{c-h} = K \tag{16}$$

The pH can be then found by taking the −log h. From this equation it can also be found that pH 5.5 corresponds to $2\times10^{-5}$ mol/lit of carbon dioxide.

Equation (16) can be solved for c, with the result substituted into the Equation (7). This yields after some tedious, but straightforward algebra the following relationship between the desired molar fraction of carbon dioxide in the bubble and the desired concentration of hydrogen ions in the water:

$$x = 1 - \frac{(KNn)^0_{CO2}}{KN(n^0_{CO2} + n_0) + (K-h)(hV)_t} \tag{17}$$

The equations (11) and (17) constitute a closed-form mathematical model of carbon dioxide transfer, usable for design of the treatment system.

5. The Most Preferred Ballast Water Treatment System in Accordance with the Present Invention A most preferred ballast water treatment system in accordance with the present invention is next described for a large tanker of the size as 300,000 DWT. A tanker of this size may not be the most cost effective candidate for realization of the ballast water treatment features of the present invention. However, the design next set forth can be easily modified for smaller tankers.

The most preferred ballast water treatment system in accordance with the present invention is a combination of two effective treatment systems: deoxygenation and carbonation. The system is analogous of the American Underpressure System ("AUPS") of MH Systems, San Diego, Calif. (Husain et al. 2001) in that a pressure less that atmosphere, called an "underpressure" is pulled in the ullage spaces of the ballast water tanks.

The inert gas that is preferably supplied by a standard marine gas generator is approximately 84%–87% nitrogen, 12–14% carbon dioxide and about 2%–4% oxygen. This inert gas has all the ingredients necessary to combine the two very effective treatments of hypoxia and carbonation at a very reasonable cost. The laboratory tests at Scripps Institute of Oceanography, described previously, show that this gas needs very little contact time to be effective. The analyses described earlier established the flow rates and control time for hypoxia carbonated conditions.

Each ballast tank has rows of pipe at the tank floor with downward pointing nozzles. The pressurized inert gas is jetted downward out of the piping. The jets stir up the sediment for contact with the inert gas bubbles. The bubbles then rise through the ballast water to the space above the water surface, which has previously been underpressurized to −2 psi. For the purposes of this paper, a 300,000 DWT single hull tanker was used for design studies of this system to test practicality and affordability. Applicability to a 300,000 DWT double hull tanker was also examined.

Figure 4A:
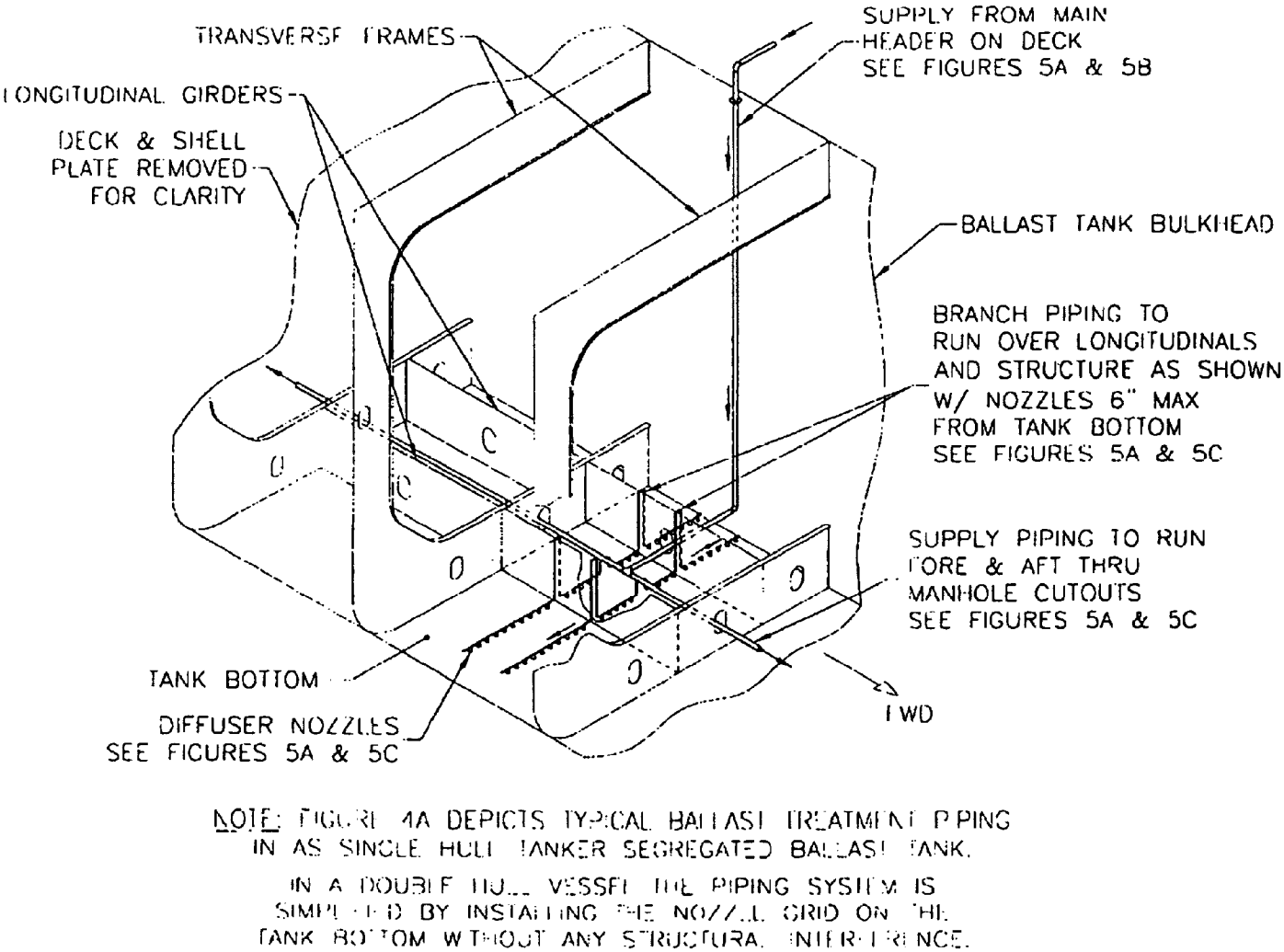
FIG. 4a shows an inboard profile, deck plan view, piping layout, nozzle detail and section through a ballast tank part of the ballast water treatment system of the present invention.

An inboard profile, deck plan view, piping layout, nozzle detail and section through a ballast tank part of the ballast water treatment system of the present invention is shown in FIG. 4a. A schematic diagram of the preferred embodiment of a ship's ballast water treatment system in accordance with the present invention—the tank of which was just previously seen in FIG. 4a—is shown in FIG. 4b.

Figure 4B:
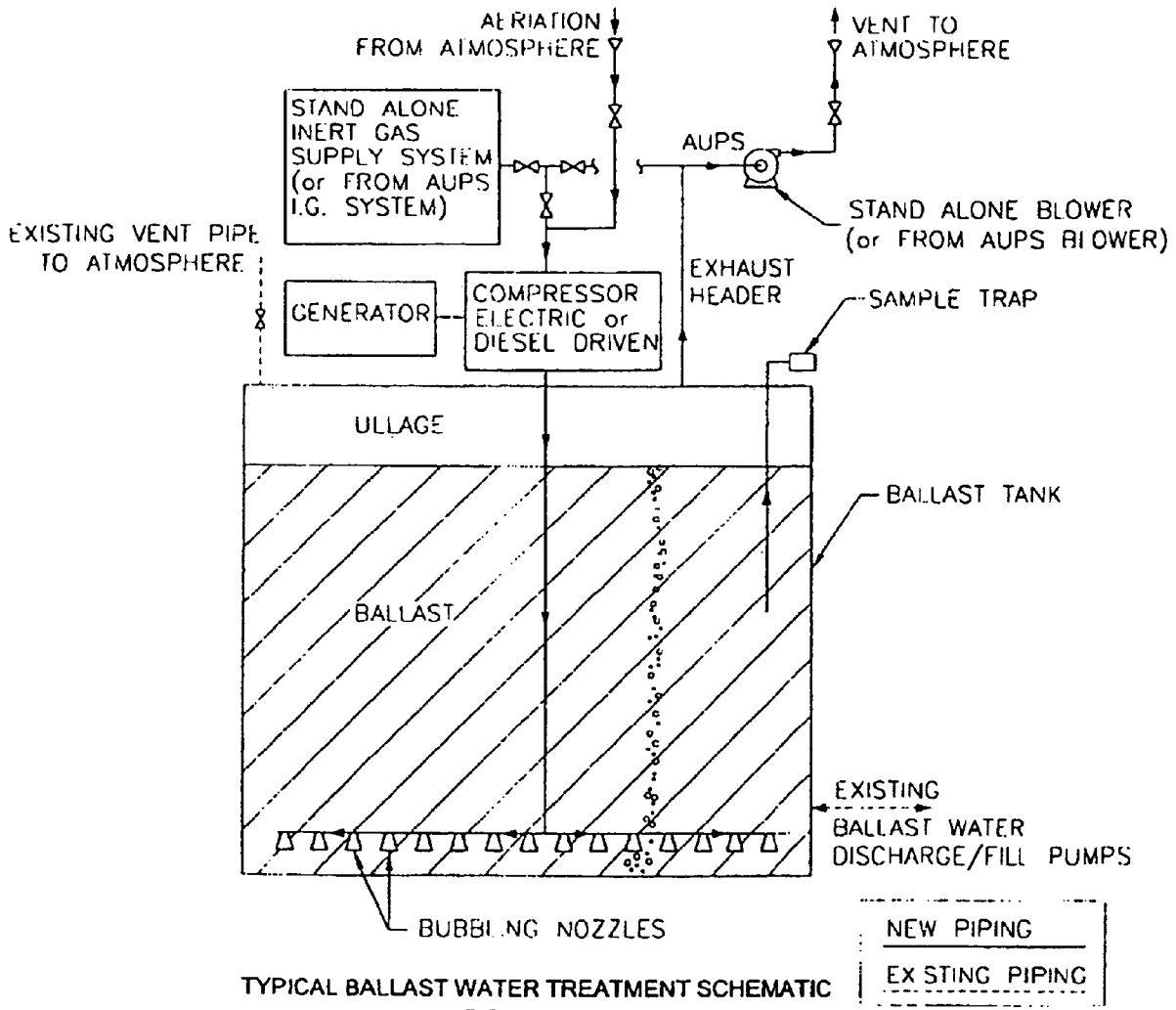
Figure 5A:
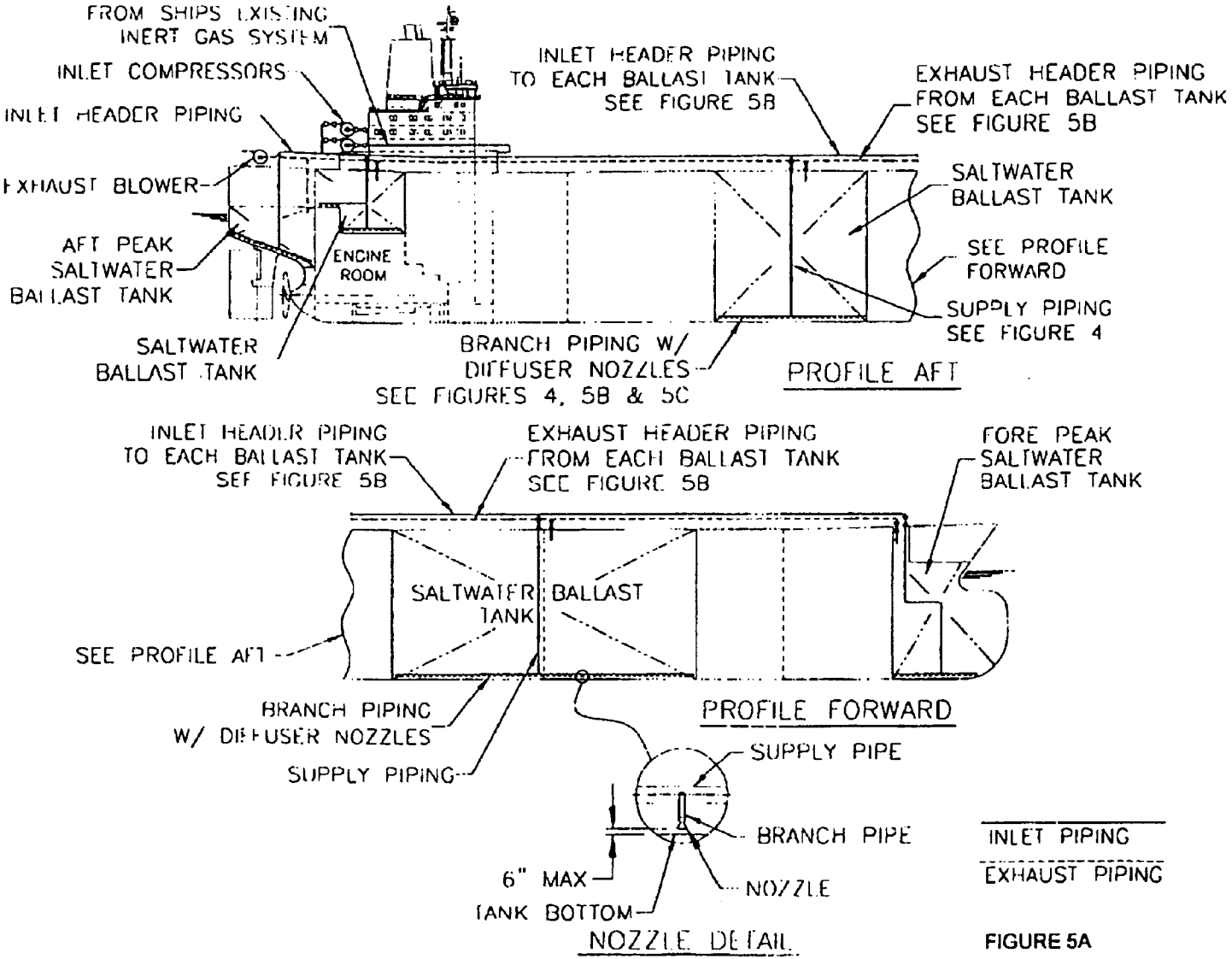
FIG. 5, consisting of FIGS. 5a through 5d, are views of the installation of the ship's ballast water treatment system in accordance with the present invention, previously seen in FIG. 4b, on an exemplary ship.
Figure 5B:
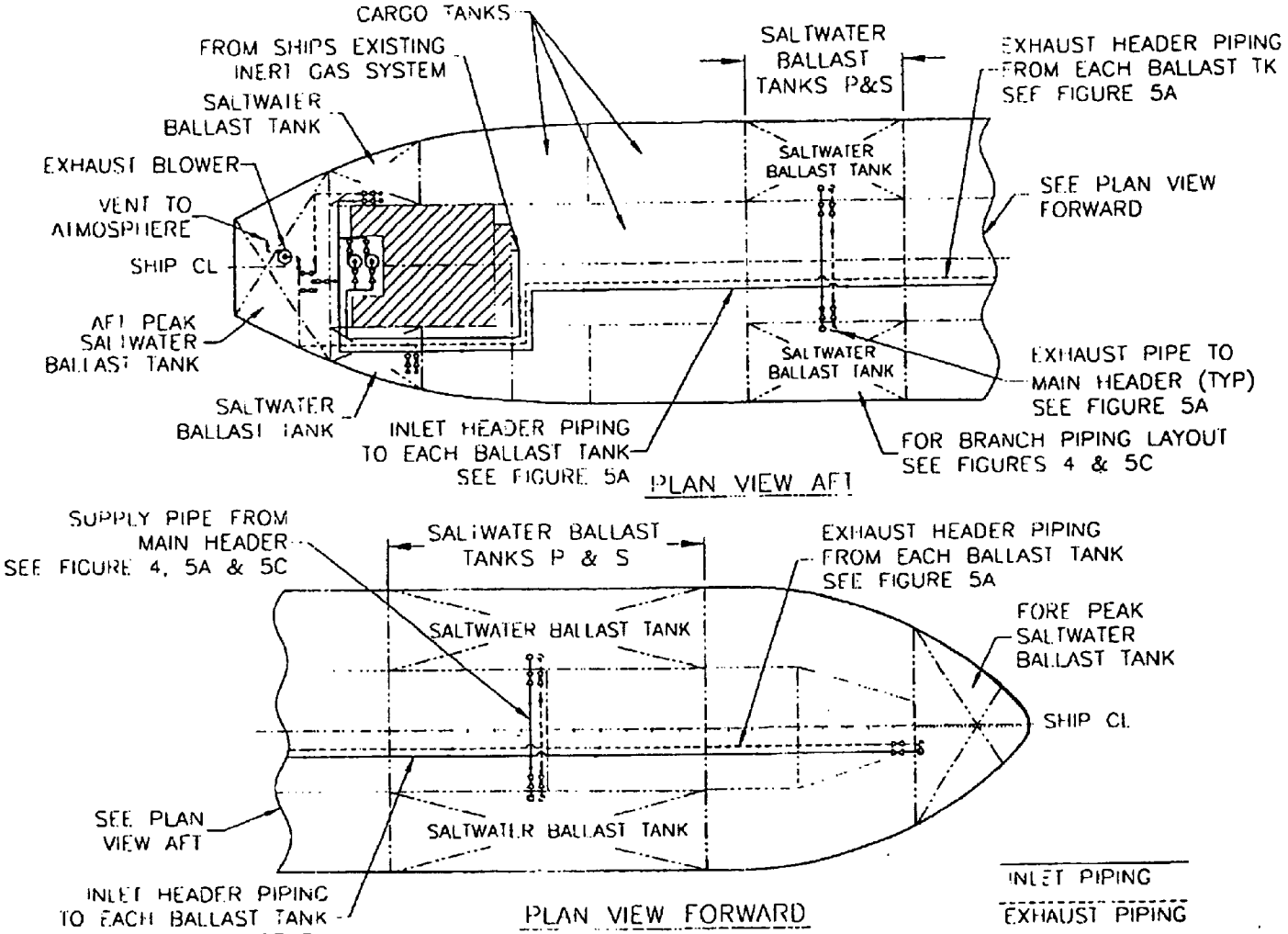
Figure 5C:
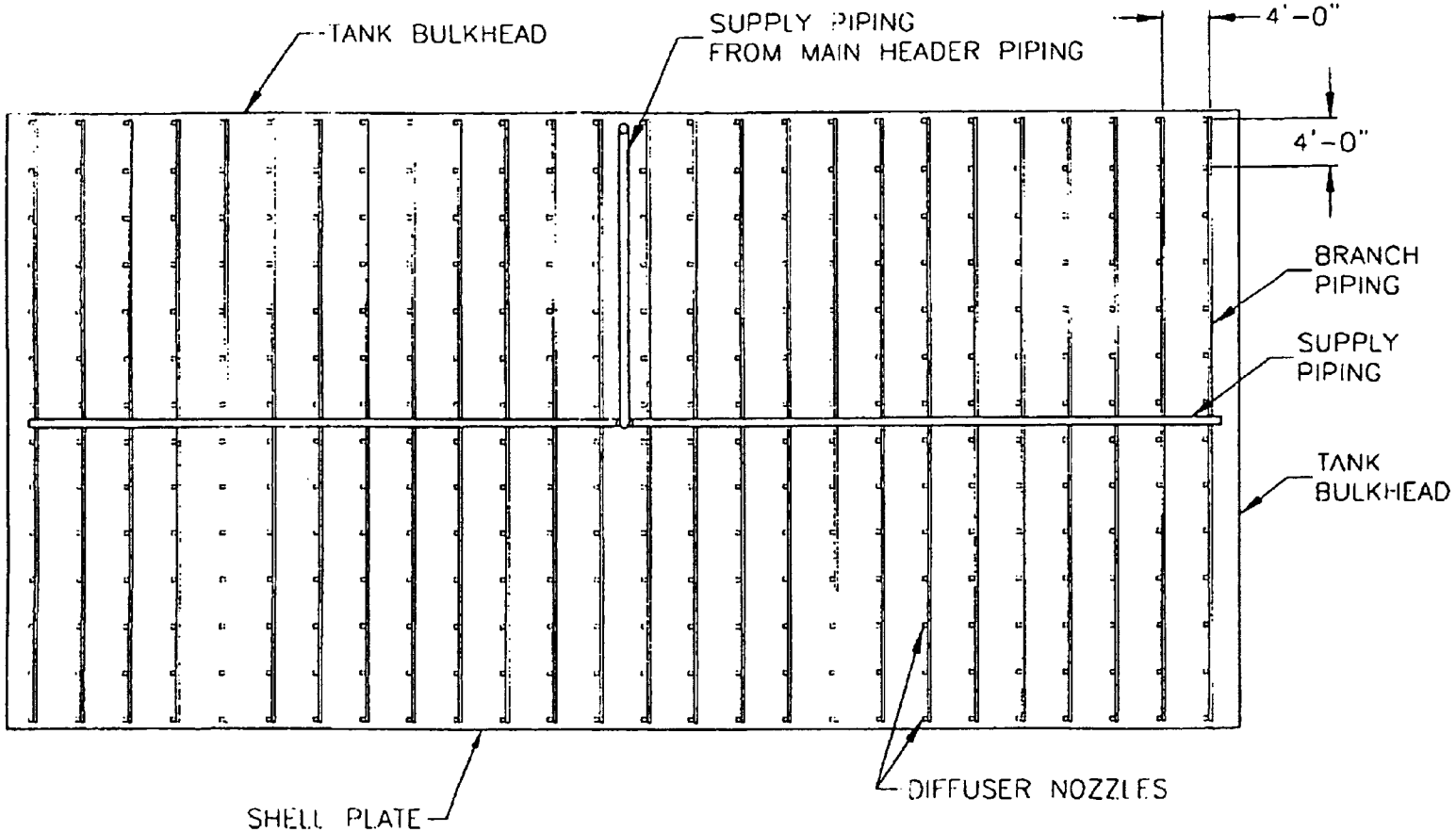
Figure 5D:
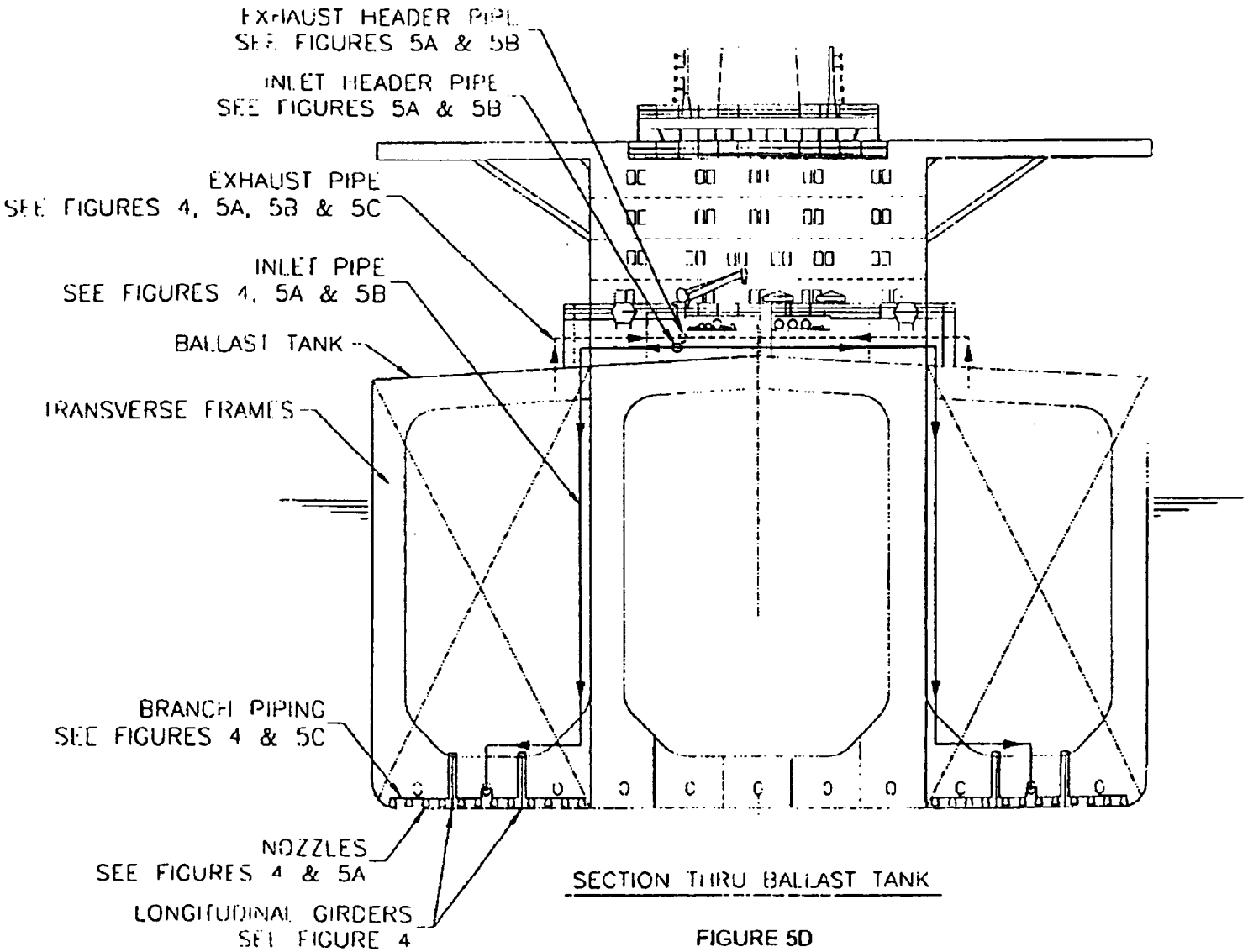

Various views of the installation of the ship's ballast water treatment system in accordance with the present invention, previously seen in FIG. 4b, on an exemplary ship are shown in FIGS. 5a–5d. The exemplary ship is a 300,000 DWT double hull tanker. This particular ship incurs somewhat less installation cost since the tank bottom is smooth as is best shown in FIG. 5a. For this 300,000 DWT tanker, there are 8 ballast tanks as follows in Table 2 of FIG. 3. Table 2 lists the ballast water tank capacities.

From analyses and experience (Tamburri et al. 2002), it is estimated the hypoxia and pH conditions can be set in at least 8 hours, even in the largest tanks, B3 Port and Starboard. The flow rate is 1350 cfm for each of these tanks. With one 1500 cfm marine gas generator, and treating each tank sequentially, it is estimated that all 8 tanks can be in a hypoxia, low-pH (5.5–6) condition in less than 48 hours. Contact time for essentially total lethality may not require more than another 24 hours although the remainder of the 2 to 3 week voyage is available.

The space above the liquid in each tank is underpressurized to about −2 psi and maintained throughout the voyage. As the gas bubbles rise up to the surface, they are evacuated by a blower to maintain the underpressure of the inert gas blanket at the surface. The underpressure further facilitates the solubility of the oxygen (see analysis) and tends to compensate for the oxygen captured in the bubbles as they rise.

Since the ballast tanks are treated sequentially, only two 700 cfm compressors are required to compress the gas. The gas is compressed enough to offset the hydrostatic head plus an additional 25% psi to provide a jet force for stirring the sediment. Two compressors are provided for redundancy.

If there are some concerns with the dumping of hypoxia and carbonated treated water, it is easily countered with the system discussed in this paper. The compressors will shift over from the gas generator to atmospheric and the ballast water will be oxygenated within just a few hours. In this same period of time the $CO_2$ is readily washed out since the air contains no $CO_2$ component.

Sensors are needed to monitor the pH to ensure that it never goes below about 5.5. Sensors will measure dissolved oxygen content to ensure an adequate deoxygenation is established. Sensors will also monitor the underpressure. The control system will remotely start and stop the gas generator, the compressor and the blower. The control system also remotely controls the valves off of the inert gas manifold to each ballast tank and the valving for the underpressure manifold.

The system of the present invention may be controlled by computers, or, more preferably, by a suitably designed arrangement of programmable logic controllers (PLCs). These devices are widely commercially available. They are also easy to program and maintain.

A control console with displays integrates the functions of the inert gas generator and the entire ballast water treatment system of the present invention, as well as providing for monitoring, status displays and manual override, if required.

Underpressurization tests have been conducted with that oil tank ullage space gas depressurization system which is, insofar as tank "underpressures" go, an analog of the ballast water system of the present invention. Namely, the American Underpressure System (AUPS) of MH Systems, San Diego, Calif. has already been installed and tested on a naval reserve fleet tanker. This testing verified (i) the structural capability of ships (oil) tanks (but with applicability to all ship's tanks, which are equivalently constructed) to withstand the negative pressure of −3 psi, and also (ii) the controls needed to maintain the required underpressure. These findings are applicable to the equipment and controls that will be used for the ballast water treatment system of the present invention.

6. Economic Evaluation of the Most Preferred Ballast Water Treatment System of the Present Invention as Used for a 300,000 DWT Tanker (as Set Forth in Section 5 Above)

As stated in section 5. above, the inventors are cognizant that a large tanker of the size as 300,000 DWT may not be the most cost effective candidate for realization of the ballast water treatment features of the present invention. However, the following economic analysis may readily be modified for smaller tankers.

In making an economic evaluation, the analysis methodology described in Mackey, et al. (2000) was used. See Mackey, T. P., Tagg, R. D., Parsons, M. G., (May, 2000). Technologies for Ballast Water Management, Proc. 8$^{th}$ ICMES/SNAME New York Metropolitan Section Symp. This method states, "a logical basis for economic comparisons would be a change in Required Freight Rate (RFR)." Since there would be no change in cargo capacity, then:

$$\Delta RFR = \frac{[CRF(i, n) * \Delta P + \Delta Y]}{C} \tag{18}$$

where CRF(i,n) is a capital recovery factor for an interest rate i for n for economic payback years; ΔP is change in Capital Cost; and ΔY is net change in annual operating cost and revenue.

Mackey et al. (2000) stated that the economic payback period for conversions is typically 5 years. See Mackey, et al., op. cit.

A 300,000 DWT tanker is selected for analysis. As stated earlier, a ballast water treatment system applicable for ships must have the capacity for treating huge quantities of ballast water. If a system is practical and economical for treating a ship with 8 ballast tanks of 110,823 cubic meters, then it is practical for all ship types. The economics would have to be assessed for ships of other, smaller ballast capacity, as the economics might not scale. But obviously, the effectiveness as well as the practicality of the system would be established.

Table 3 of FIGS. 6a and 6b lists the principal parts and materials in the ballast water treatment system together with estimated prices and labor costs.

The total cost is approximately $3,057,100. All tankers already have some type of inert gas generating capability. The newer tankers have generators with a gas mixture discharge similar to the mix used in the above-described experiments at Scripps Institute of Oceanography. Nevertheless, for conservatism, the generator has been included in the cost. Similarly tankers probably have sufficient excess electrical capacity to supply the load of this equipment—the compressors and blower. This is especially true since this is on the return trip in ballast and the machinery will only run about 48 hours each trip. Nevertheless, again for extreme conservation, a 300 KW generator has been included.

To make a usefully indicative estimate of operating costs, the following assumptions were made:

The tanker will operate to 360 days per year. Six (6) voyages per year between Persian Gulf and USA. half of the voyages are return trips in ballast, or 6 trips a year. The 2 compressors and blower are assumed to operate 48 hours to obtain hypoxia and carbonation in ail 8 tanks (note that actually the cfm of both compressors is only required for tanks B3 port and starboard and B6 port and starboard.

Operating costs are primarily the fuel costs for the inert gas generator and the 300 KW generator.

The factor n is 5 years (economic payback period) and i (interest rate) is 8%.

If the gas and electric generators operate 48 hours for each of 6 voyages, then the total operating time is 288 hours per year for each generator. About 6,000 gallons of diesel fuel would be consumed by the electric generator and for the gas generator about 16,500 gallons. This is a total of 22,500 gallons. At a cost $1.25 per gallon, the yearly operating cost will be about $28,125. Considering the few hours per year that the machinery operates and the fact that the ship has no cargo and therefore less requirements of the crew, minimal cost has been allocated for maintenance.

Therefore:

$$CRF(i, n) = 0.25$$

$$\Delta P = \$3{,}057{,}100$$

$$\Delta Y = \$28{,}125$$

$$C = 300{,}000 \text{ tons}$$

$$RFR = \frac{0.25 \times 3{,}057{,}100 + 28{,}125}{300{,}000 \times 6} = \$.44/\text{ton} \tag{19}$$

In estimating the cost of treatment per ton of ballast water, the estimated annual operating costs of $28,125 is used. The approximate 4 million cubic feet of ballast is 128,000 tons. Six trips are made in ballast which is a total of 768,000 tons treated. Therefore, cost of ballast water treatment is 3.7 cents per ton.

7. Practicality and Affordability of a Ballast Water Treatment System in Accordance with the Present Invention This ballast water treatment system is focused on treating the huge amounts of ballast water discharged into US harbors. It has the capacity to readily treat these huge quantities using standard marine components. For tankers that already have the major components on board, it would be very affordable. And for tankers with the AUPS spill containment, the added cost would be even less expensive.

Also, it appears (although not tested) that this system may be adequately effective in treating sediments. Ballast Water Exchange leaves sediment and other residue untreated. In fact, only the filtration concept treats sediment, by eliminating it.

In accordance with the preceding explanation, variations and adaptations of the ballast water treatment methods and system in accordance with the present invention will suggest themselves to a practitioner of the gas handling, gas flow, and gas diffusion arts. For example, rather than exposing a large surface of gas in the form of small bubbles to the ballast water in tanks, the surface area of the ballast water available for gaseous interchange could be augmented by spraying the ballast water in an enclosed atmosphere of the desired gases. In other words, the (substantially) inert gases can be brought to the ballast water, or the ballast water to the (substantially) inert gases.

In accordance with these and other possible variations and adaptations of the present invention, the scope of the invention should be determined in accordance with the following claims, only, and not solely in accordance with that embodiment within which the invention has been taught.

What is claimed is:

1. A method of killing aquatic nuisance species in ship's ballast water comprising:

infusing carbon dioxide into the ship's ballast water at a level effective to kill aquatic nuisance species by hypercapnia*; while*

*lowering oxygen in the same ship's ballast water to a level effective to kill aquatic nuisance species by hypoxia*.

2. The method according to claim 1 wherein the infusing is with a gaseous mixture of ≧11% carbon dioxide by molar volume.

3. The method according to claim 2 wherein the infusing with the gaseous mixture of ≧11% carbon dioxide transpires until the ballast water is hypercapnic to ≧20 ppm dissolved carbon dioxide.

4. The method according to claim 2 wherein the infusing transpires by bubbling the gaseous mixture through the ballast water.

5. The method according to claim 4 wherein the bubbling of the gaseous mixture is through the ballast water that is under less than atmospheric pressure.

6. The method according to claim 5 wherein the bubbling of the gaseous mixture through the ballast water less than atmospheric pressure is within ballast water tanks of the ship where ullage space gas pressure is −2 p.s.i. below atmospheric pressure or lower.

7. The method according to claim 1 [that, concurrent with the infusing, further] *wherein the lowering* comprises:

depleting oxygen in the ship's ballast water at a level effective to kill aquatic nuisance species by hypoxia.

8. The method according to claim 7 wherein the infusing is with a gaseous mixture of ≧11% carbon dioxide by molar volume.

9. The method according to claim 8 wherein the infusing with the gaseous mixture of ≧11% carbon dioxide transpires until the ballast water is hypercapnic to ≧20 ppm carbon dioxide.

10. The method according to claim 8 wherein the infusing transpires by bubbling the gaseous mixture through the ballast water.

11. The method according to claim 10 wherein the bubbling of the gaseous mixture is through the ballast water that is under less than atmospheric pressure.

12. The method according to claim 11 wherein the bubbling of the gaseous mixture through the ballast water less than atmospheric pressure transpires within ballast water tanks of the ship where tank ullage space gas pressure is −2 p.s.i. below atmospheric pressure, or lower.

13. The method according to claim 7 wherein the depleting transpires by act of substituting gases, including oxygen, that are initially dissolved in the ballast water by infusion of a gaseous mixture containing the carbon dioxide but also containing ≦4% oxygen.

14. The method according to claim 13 wherein the depleting with the gaseous mixture of ≦4% oxygen transpires until the ballast water is hypoxic to ≦1 ppm dissolved oxygen.

15. The method according to claim 13 wherein the depleting transpires by bubbling the gaseous mixture through the ballast water.

16. The method according to claim 15 wherein the bubbling of the gaseous mixture is through the ballast water that is under less than atmospheric pressure.

17. The method according to claim 16 wherein the bubbling of the gaseous mixture through the ballast water less than atmospheric pressure transpires within ballast water tanks of the ship where tank ullage space gas pressure is −2 p.s.i. below atmospheric pressure, or lower.

18. The method according to claim 7 that, concurrent with the infusing, further comprises:

acidifying the ship's ballast water at a level effective to kill aquatic nuisance species.

19. The method according to claim 18 wherein the infusing is with a gaseous mixture of ≧11% carbon dioxide by molar volume;

wherein the acidifying is concurrently realized by the chemical reaction $$CO_2+H_2O \rightarrow H_2CO_3 \leftrightarrows H^+ + HCO_3^-,$$

which chemical reaction is interpretable that carbon dioxide ($CO_2$) reacts with water ($H_2O$) to form carbonic acid ($H_2CO_3$), which carbonic acid then partially dissociates to form hydrogen ($H^+$) and bicarbonate ions ($HCO_3^-$).

20. The method according to claim 19 wherein the infusing with the gaseous mixture of ≧11% carbon dioxide transpires until both (1) the ballast water is hypercapnic to ≧20 ppm carbon dioxide, and (2) the same ballast water is acidic to pH≦7.

21. The method according to claim 19 wherein the infusing and, consequent to the infusing, the acidifying transpires by bubbling the gaseous mixture through the ballast water.

22. The method according to claim 21 wherein the bubbling of the gaseous mixture is through the ballast water that is under less than atmospheric pressure.

23. The method according to claim 22 wherein the bubbling of the gaseous mixture through the ballast water less than atmospheric pressure transpires within ballast water tanks of the ship where tank ullage space gas pressure is −2 p.s.i. below atmospheric pressure, or lower.

24. The method according to claim 18 wherein the depleting is transpires by act of substituting gases, including oxygen, that are initially dissolved in the ballast water by infusion of a gaseous mixture containing the carbon dioxide but also containing ≦4% oxygen.

25. The method according to claim 24 wherein the depleting with the gaseous mixture of ≦4% oxygen transpires until the ballast water is hypoxic to ≦1 ppm dissolved oxygen.

26. The method according to claim 24 wherein the depleting transpires by bubbling the gaseous mixture through the ballast water.

27. The method according to claim 26 wherein the bubbling of the gaseous mixture is through the ballast water that is under less than atmospheric pressure.

28. The method according to claim 27 wherein the bubbling of the gaseous mixture through the ballast water less than atmospheric pressure transpires within ballast water tanks of the ship where tank ullage space gas pressure is −2 p.s.i. below atmospheric pressure, or lower.

29. A method of reducing survival of aquatic nuisance species in ship's ballast water comprising:

permeating to equilibrium a gaseous mixture consisting essentially of ≧84% nitrogen, ≧11% carbon dioxide and ≦4% oxygen through ship's ballast water until the ballast water is hypoxic to ≦1 ppm oxygen, hypercapnic to ≧20 ppm carbon dioxide, and acidic to pH≦7.

30. The method according to claim 29 wherein the permeated gaseous mixture is the output of a marine inert gas generator.

31. The method according to claim 29 wherein the permeated gaseous mixture that is output from a marine inert gas generator consists essentially of nitrogen in the range from 87% to 84% mole percent, carbon dioxide in the range from 14% to 11% mole percent, and oxygen in the range from 2% to 4% mole percent.

32. The method according to claim 29 continued until the ship's ballast water until the ballast water is hypoxic to ≦1 ppm oxygen, hypercapnic to ≧20 ppm carbon dioxide, and acidic to pH≦7.

33. The method according to claim 29 wherein the gaseous mixture is permeated to equilibrium within the ballast water by being bubbled through the ballast water.

34. The method according to claim 33 wherein the gaseous mixture bubbled to equilibrium within the ballast water is so bubbled into ballast water under a pressure less than atmosphere.

35. The method according to claim 34 wherein the gaseous mixture bubbled to equilibrium within the ballast water under a pressure less than atmosphere is into ballast water tanks of the ship where tank ullage space gas pressure is −2 p.s.i. below atmospheric pressure, or lower.

36. A system for reducing survival of aquatic nuisance species in ship's ballast water comprising:

a gas generator producing a gaseous mixture enhanced in carbon dioxide relative to both (i) atmospheric proportion of carbon dioxide, and (ii) proportion of carbon dioxide that is dissolved in sea water;

piping having and defining discharge orifices at the base of, and inside, the ship's ballast water tank; and a compressor pressuring the gaseous mixture received from the gas generator sufficiently so that, as delivered to the piping, it will be forced out the discharge orifices and bubble upward through the ballast water;

wherein gaseous interchange transpires between (i) the gaseous mixture, enhanced in carbon dioxide, that is within the bubbles and (ii) dissolved gases within the ballast water;

wherein dissolved gases within the ballast water will become enhanced in carbon dioxide to a level inducing hypercapnia in aquatic nuisance species within the ballast water.

37. The system according to claim 36 wherein the gas generator is producing a gaseous mixture having ≧11% carbon dioxide by molar volume.

38. The system according to claim 36 wherein the gas generator producing the gaseous mixture enhanced in carbon dioxide comprises:

an inert gas generator producing the gaseous mixture that is concurrently diminished in oxygen over both (i) atmospheric proportion of oxygen, and (ii) proportion of oxygen dissolved in sea water;

wherein the gaseous interchange transpiring between (i) the gaseous mixture, diminished in oxygen, that is within the bubbles and (ii) the dissolved gases within the ballast water causes dissolved gases within the ballast water to become diminished in oxygen to a level inducing hypoxia in aquatic nuisance species within the ballast water.

39. The system according to claim 38 wherein the inert gas generator is producing a gaseous mixture having ≧11% carbon dioxide by molar volume.

40. The system according to claim 39 wherein the inert gas generator is producing a gaseous mixture having ≦4% oxygen by molar volume.

41. The system according to claim 36 further comprising:

a blower evacuating gases from within the ullage space of the ship's tank so as to produce a pressure therein which is at least 2 p.s.i. less than prevailing atmospheric pressure outside the tank.

42. The system according to claim 36 wherein the piping comprises:

a matrix of piping in a grid array at the base of, and inside, the ship's ballast water tank.

43. The system according to claim 42 wherein the discharge orifices of the piping are variously directed both upwards toward the lop and the tank and downwards towards the base of the tank.

44. The system according to claim 36 wherein the compressor is producing a pressure more than 2 p.s.i. greater than a hydrostatic pressure then prevailing at the base of the ship's ullage tank.

45. The system according to claim 36 wherein the amount and constituents of gas produced by the inert gas generator, pressured by the compressor, and delivered to the piping to be bubbled upwards through the ballast water, is sufficient to render the ballast water hypoxic to ≦1 ppm oxygen, hypercapnic to ≧20 ppm carbon dioxide, and acidic to pH≦7.

46. The system according to claim 45 wherein the amount and constituents of gas produced by the inert gas generator, pressured by the compressor, and delivered to the piping to be bubbled upwards through the ballast water, is sufficient to so render the ballast water hypoxic to ≦1 ppm oxygen, hypercapnic to ≧20 ppm carbon dioxide, and acidic to pH≦7 at a rate sufficient to establish equilibrium in the ballast water within a period less than (1) one-half the normal voyage duration of the ship minus (2) the required time for aquatic nuisance species to die to the 90% level.

*47. A method of killing aquatic nuisance species in ship's ballast water comprising:*

*infusing carbon dioxide into the ship's ballast water that is maintained under atmospheric pressure or less at a level effective to kill aquatic nuisance species by hypercapnia.*

*48. A method of killing aquatic nuisance species in ship's ballast water comprising:*

*infusing carbon dioxide into the ship's ballast water at a level effective to kill aquatic nuisance species by hypercapnia in combination with reduced, acid, pH.*

*49. A method of killing aquatic nuisance species in ship's ballast water comprising:*

*infusing carbon dioxide into the ship's ballast water that is maintained under atmospheric pressure or less at a level effective to kill aquatic nuisance species by hypercapnia in combination with reduced, acidic, pH; while*

*lowering oxygen in the same ship's ballast water to a level effective to kill aquatic nuisance species by hypoxia.*

* * * * *